United States Patent
Shlomov et al.

(10) Patent No.: US 12,141,540 B2
(45) Date of Patent: Nov. 12, 2024

(54) MESSAGE MAPPING AND COMBINATION FOR INTENT CLASSIFICATION

(71) Applicant: INTERNATIONAL BUSINESS MACHINES CORPORATION, Armonk, NY (US)

(72) Inventors: Segev Shlomov, Haifa (IL); Inbal Ronen, Haifa (IL); Ella Rabinovich, Hod Hasharon (IL); David Boaz, Bahan (IL); Ofer Lavi, Tel Aviv (IL); Ateret Anaby-Tavor, Givat Ada (IL)

(73) Assignee: International Business Machines Corporation, Armonk, NY (US)

( * ) Notice: Subject to any disclaimer, the term of this patent is extended or adjusted under 35 U.S.C. 154(b) by 313 days.

(21) Appl. No.: 17/653,452

(22) Filed: Mar. 3, 2022

(65) Prior Publication Data

US 2023/0281396 A1  Sep. 7, 2023

(51) Int. Cl.
*G06F 40/40* (2020.01)
*G06F 40/20* (2020.01)
*G06F 40/30* (2020.01)

(52) U.S. Cl.
CPC .............. *G06F 40/40* (2020.01); *G06F 40/20* (2020.01); *G06F 40/30* (2020.01)

(58) Field of Classification Search
CPC .......... G06F 40/40; G06F 40/20; G06F 40/30; G06F 40/279; G06F 40/35
USPC .......................................................... 704/9
See application file for complete search history.

(56) References Cited

U.S. PATENT DOCUMENTS

| | | | |
|---|---|---|---|
| 2016/0099892 A1* | 4/2016 | Palakovich | H04L 51/04 709/206 |
| 2017/0277993 A1* | 9/2017 | Beaver | G06Q 30/0201 |
| 2018/0115643 A1 | 4/2018 | Skiba | |
| 2018/0203851 A1* | 7/2018 | Wu | G06N 3/006 |
| 2019/0034414 A1 | 1/2019 | Kim | |
| 2019/0155947 A1* | 5/2019 | Chu | G06F 16/358 |
| 2019/0347281 A1* | 11/2019 | Natterer | G06F 16/3344 |
| 2021/0090570 A1* | 3/2021 | Aharoni | H04M 3/4936 |
| 2021/0110816 A1* | 4/2021 | Choi | G10L 15/063 |

(Continued)

FOREIGN PATENT DOCUMENTS

WO      2021074459 A1      4/2021

OTHER PUBLICATIONS

Taiwan Office Action, Taiwan Application No. 112101488, Dated Oct. 18, 2023, 8 pages. (English translation 6 pages).

(Continued)

*Primary Examiner* — Pierre Louis Desir
*Assistant Examiner* — Fouzia Hye Solaiman
(74) *Attorney, Agent, or Firm* — Caleb D. Wilkes

(57) ABSTRACT

A method, computer system, and a computer program product for automated agent intent detection enhancement are provided. A first message from a first user is received. The first message is generated during a first conversation between the first user and a first automated agent. A computer produces a second message that includes a same request as the first message but a different language modality than the first message. The second message and the first message are combined to form a combined message. The combined message is input into the first automated agent such that the first automated agent produces an intent classification for the first message.

20 Claims, 9 Drawing Sheets

(56) References Cited

U.S. PATENT DOCUMENTS

| | | | |
|---|---|---|---|
| 2021/0157989 A1* | 5/2021 | Orr | G06F 40/216 |
| 2021/0158203 A1* | 5/2021 | Ganti | G06N 3/08 |
| 2021/0303784 A1* | 9/2021 | Brdiczka | G06F 40/35 |
| 2021/0350076 A1 | 11/2021 | Kantor | |
| 2022/0215169 A1* | 7/2022 | Edwards | G06N 20/00 |
| 2023/0108637 A1* | 4/2023 | Rabinovich | G06F 16/355 717/124 |

OTHER PUBLICATIONS

Bird et al., "Chatbot Interaction with Artificial Intelligence: human data augmentation with T5 and language transformer ensemble for text classification", Journal of Ambient Intelligence and Humanized Computing, Springer, Published Online Aug. 23, 2021, pp. 1-16, <https://link.springer.com/content/pdf/10.1007/s12652-021-03439-8.pdf>.

Disclosed Anonymously, "Method and Apparatus for Skill Acquisition of Virtual Assistants (VAs) at Handoffs", IP.com Prior Art Database Technical Disclosure No. IPCOM000258811D, Jun. 17, 2019, pp. 1-7, <https://priorart.ip.com/IPCOM/000265556>.

Disclosed Anonymously, "Method to Reduce the Number of Questions Asked Due to Conversation Handoffs Between Agents", IP.com Prior Art Database Technical Disclosure No. IPCOM000265556D, Apr. 23, 2021, pp. 1-5, <https://priorart.ip.com/IPCOM/000265556>.

Falke et al., "Leveraging User Paraphrasing Behavior in Dialog Systems to Automatically Collect Annotations for Long-Tail Utterances", Proceedings of the 28th International Conference on Computational Linguistics: Industry Track, Dec. 2020, Published Online, International Committee on Computational Linguistics, doi: 10.18653/v1/2020.coling-industry.3, pp. 21-32, <https://aclanthology.org/2020.coling-industry.3>.

Mell et al., "The NIST Definition of Cloud Computing", National Institute of Standards and Technology, Special Publication 800-145, Sep. 2011, pp. 1-7.

Morse et al., "Build more effective conversations on Amazon Lex with confidence scores and increased accuracy", AWS Machine Learning Blog, Aug. 6, 2020, pp. 1-6, <https://aws.amazon.com/blogs/machine-learning/build-more-effective-conversations-on-amazon-lex-with-confidence-scores-and-increased-accuracy/>.

* cited by examiner

MESSAGE MAPPING AND COMBINATION FOR INTENT CLASSIFICATION

BACKGROUND

The present invention relates generally to assisting an automated agent which may interact with humans in a webchat, an audio conversation, or in some other manner. Automated agents are programmed to provide responses to user messages in an automated manner.

SUMMARY

According to one exemplary embodiment, a computer-implemented method is provided that includes receiving a first message from a first user. The first message is generated during a first conversation between the first user and a first automated agent. A computer produces a second message that includes a same request as the first message but a different language modality than the first message. The second message and the first message are combined to form a combined message. The combined message is input into the first automated agent such that the first automated agent produces an intent classification for the first message. A computer system and a computer program product corresponding to the above method are also disclosed herein.

BRIEF DESCRIPTION OF THE DRAWINGS

These and other objects, features, and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
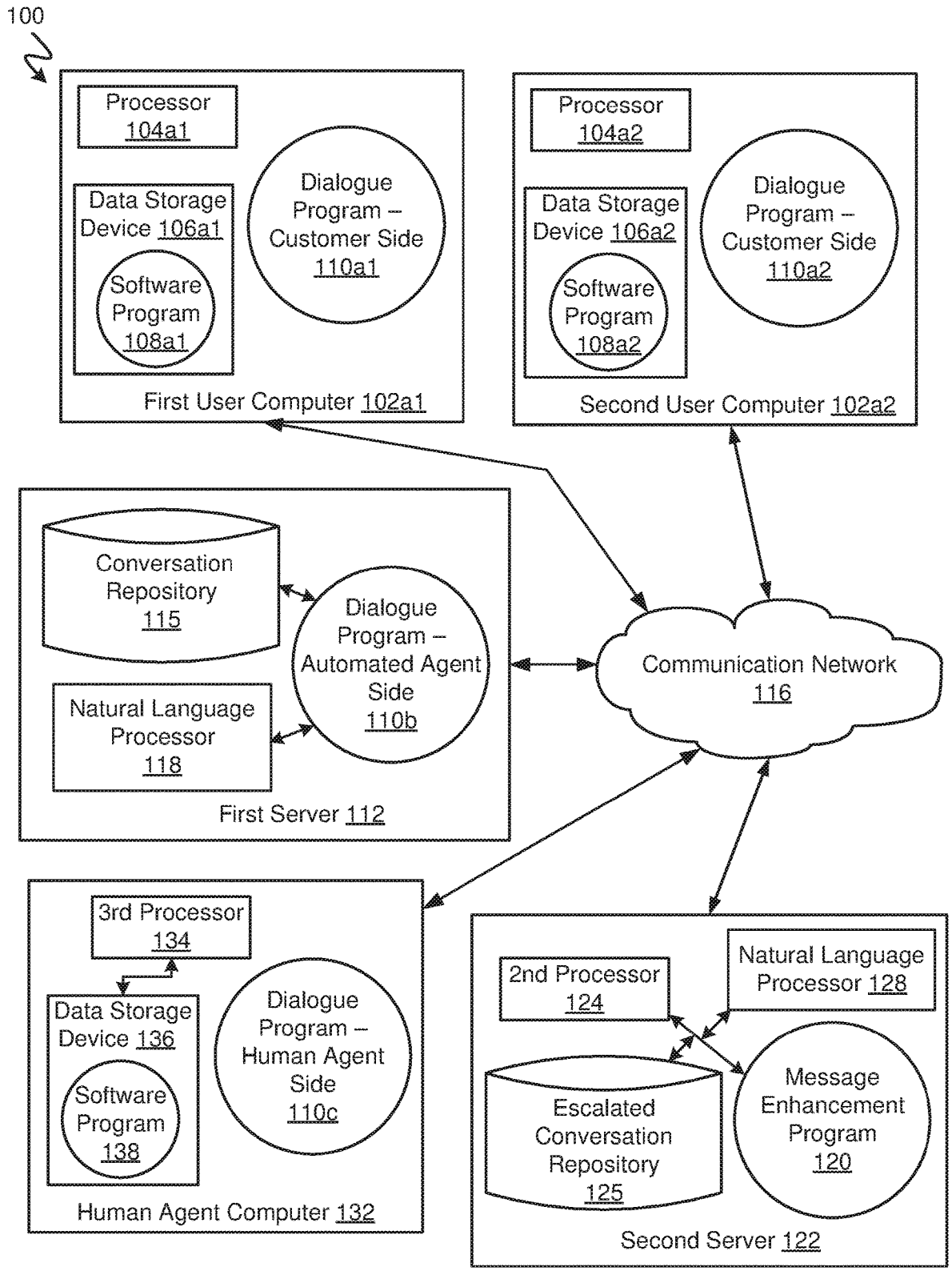
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The following described exemplary embodiments provide a method, computer system, and computer program product for improving intent detection of automated agents such as chatbots. The usage of automated agents for handling various user interactions is increasing in various business, government, and other settings. The automated agent may receive and respond to an inquiry from a human. The automated agent is configured to provide an unmanned dialogue service that may engage humans.

This interaction between the automated agent and a human may occur via the human having a text exchange with the automated agent. Specifically, the human may in some examples input text at a computer such as a cell phone or type into a keyboard to produce text in a textbox of a display screen of a computer. An automated agent which participates in such a text conversation may be referred to as a chatbot. The human-automated agent interaction may additionally and/or alternatively occur via a voice or sign language conversation in which the human speaks or signs, the sounds are recorded via a microphone or a video camera, text is generated from the sounds/signs, and the text is analyzed by the computer. The human-automated agent may implement natural language processing using artificial intelligence and/or machine learning in order to analyze incoming language information such as text. Software of the automated agent may allow the automated agent to interpret the incoming text information and to automatically generate an appropriate response to the inquiry of the human. The automated agent interprets an intent of the message/inquiry sent by the human. The response that is generated by the automated agent depends on the interpretation that the automated agent gives to the incoming message. The software of the automated agent may include decision trees, data storage, entity detection for natural language processing, intent detection, natural language processing, artificial intelligence, and/or machine learning to help understand the inquiry of the user. The owner/manager may train the automated agent with organization information divided into topics with which the automated agent may provide help for a user.

Humans may engage in random behavior and produce random sentences or statements in the context of conversation. One single purpose of an inquiry may be presented in a myriad of word formats and expressions that are generated by the various humans who engage with the automated agent. The various formats and/or expressions used may change depending on who is speaking and the party with whom the speaker is conversing. Two statements/sentences/ questions may have differently-organized structures and use different verbs, nouns, and/or adjectives but nevertheless have a similar intent. Two inquiries may have differently-organized structures and use different verbs, nouns, and/or adjectives but nevertheless provide the same or a similar request.

An automated agent may be challenged to interpret uniquely-phrased inquiries and to generate an appropriate response that will answer the inquiry of a human. The present embodiments generate improved input to provide to an automated agent so that the ability of the automated agent to interpret user inquiries and to appropriately respond to the human will be improved. These enhancements will help lead to increased human satisfaction with their interactions with automated agents and will help conserve resources of human agents who otherwise would need to be engaged as a backup to an automated agent when the automated agent is unsuccessful in satisfying the inquiry of a human who seeks an answer or information from an organization.

The present embodiments technically embody an observation that people who are seeking customer service via a technical communication such as a webchat or a voice conversation often communicate more precisely and clearly with a human agent than with an automated agent. A message the human provides to the automated agent may be vaguer and/or shorter than a corresponding message that the human provides to a human agent. It has been observed that if a person is notified that they are now being engaged for conversation by a human agent, the person often provides more information and context, e.g., multiple sentences, for their inquiry as compared to when the person types, speaks, or signs a message for the automated agent. The human may make this modification based on an assumption that the automated agent is less likely to understand a complicated statement or request. With the present embodiments, a message to an automated agent is received, a prediction is made as to how a message with the same request would or could have been made to a human agent, and then the combination of the original message and the predicted message are input, e.g., fed, into the automated agent. The predicted message may have a different language modality, e.g., a different wording, than the original message has. The language modality may be manifest with a longer request for the to-a-human placed request. The language modality may be manifest with more details and words for the to-a-human placed request. Having a different language modality for a first word group (e.g., sentence or paragraph) requires the first word group to have at least one different word than a second word group has. The two word groups could include some of the same words but would have at least one different word. The human-to-human request wording is mapped to the human-to-automated agent wording. The combining of the two messages constitutes an enhancement of the first message. The present embodiments make it possible for an automated agent to better understand and respond to the enhanced message which is information richer as compared to the original message alone.

The present embodiments may be implemented as a supplement to existing automated agents and their structure and do not require any retraining and/or restructuring of the automated agent itself or of the base data of the automated agent. The present embodiments will, therefore, achieve implementation/installation benefits. Specifically, the embodiments may be implemented and installed in a nimbler manner without having to interfere with operation of the automated agent. The present embodiments may be implemented without needing to build a new automated agent and/or virtual assistant. The human participant in the human-to-bot conversation does not have to be prompted for additional information or additional rephrasing of the original message. Thus, the present embodiments may be implemented to enhance bot intent detection and performance while preserving bot architecture and bot training data for a deployed bot. This avoidance of bot architecture restructuring is especially valuable for large scale models. The automated agent, e.g., bot, may be able to improve its accuracy for correct intent prediction because of the enhanced message which is information richer. The present embodiments may be embodied as a supplement to existing automated agents and/or virtual assistants. The present embodiments include extracting and utilizing a user-to-bot request and, in a data collection stage, a user-to-human agent request.

Thus, the present embodiments may use various automated technologies such as lookup tables, machine learning, text comparison, word-based semantic similarity comparison, and/or other artificial intelligence to enhance messages outside of the bot structure. Therefore, the present embodiments may enhance the intent detection performed by automated agents and enhance the ability of automated agents to appropriately respond to users seeking assistance. The present embodiments may achieve these benefits with a module that exists outside of the bot architecture.

Referring to FIG. 1, a networked computer environment 100 in accordance with one embodiment is depicted. The networked computer environment 100 may include a first user computer 102$a$1, a second user computer 102$a$2, a first server 112, a second server 122, and a human agent computer 132. The first user computer 102$a$1, the second user computer 102$a$2, and the first server 112 may host and be enabled to run dialogue program 110$a$1, 110$a$2, 110$b$, respectively, with the dialogue program 110$a$1, 110$a$2 on the first and second user computers 102$a$1, 102$a$2 occurring for the customer side of the dialogue and the dialogue program 110$b$ on the first server 112 occurring for the automated agent side of the dialogue. The first server 112 and the second server 122 may each be computers. The human agent computer 132 may also host and be enabled to run dialogue program 110$c$, particularly for a human agent side of the dialogue. The various computers in the networked computer environment 100, e.g., the first user computer 102$a$1, the second user computer 102$a$2, the first server 112, the second server 122, and the human agent computer 132, may communicate with each other via a communication network 116.

Figure 2A:
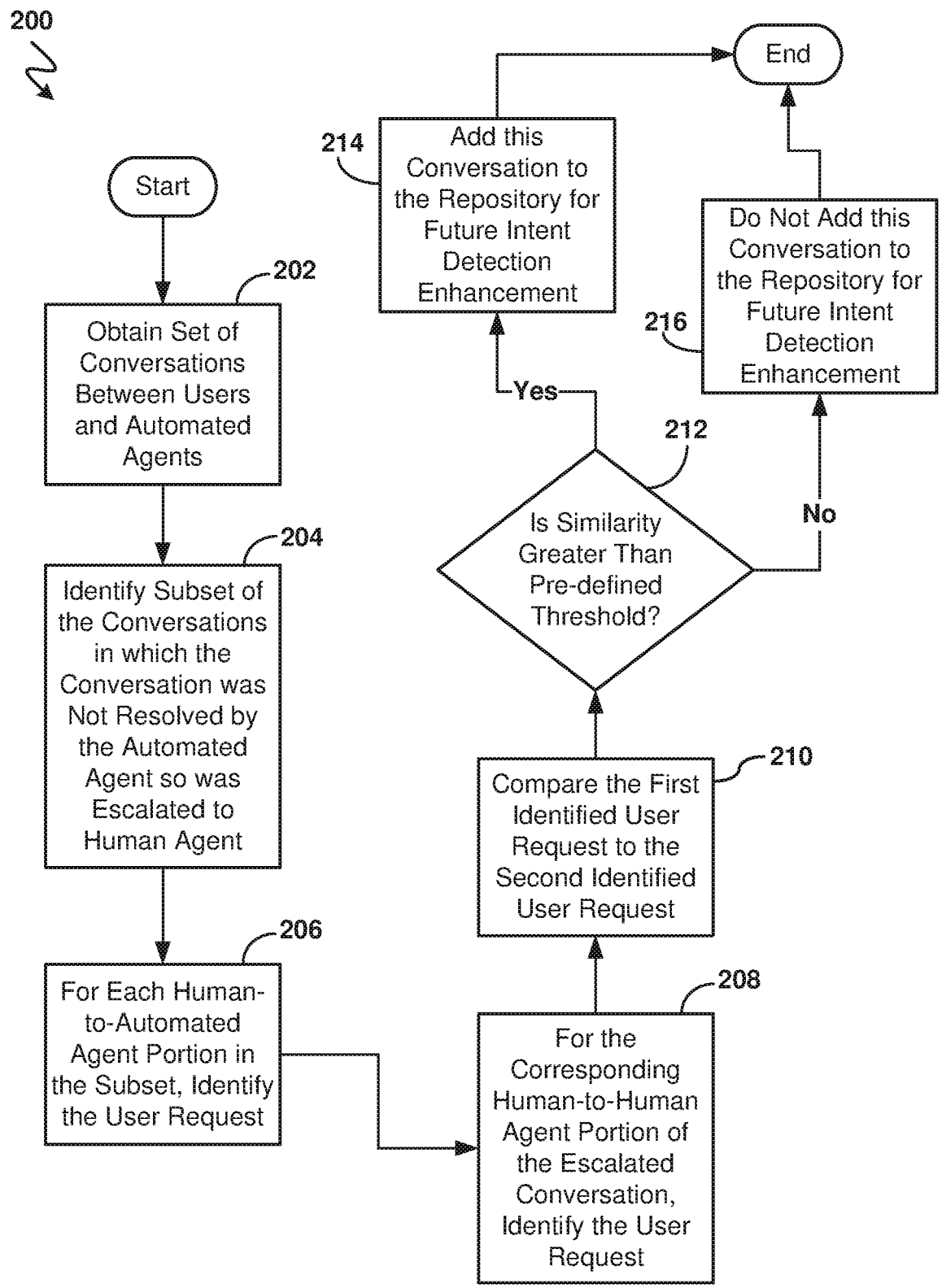
FIG. 2A is an operational flowchart illustrating an escalated conversation gathering process according to at least one embodiment.

The first user computer 102$a$1, the first server 112, and the human agent computer 132 may participate in a dialogue that may be gathered and analyzed as part of an escalated conversation gathering process 200 that is depicted in FIG. 2A and will be described subsequently. Other user computers may also participate in conversations or dialogues that may be gathered and analyzed as part of an escalated conversation gathering process 200, but for simplicity the steps shown in FIG. 2A for the escalated conversation gathering process 200 and described herein are described as occurring with respect to the first user computer 102$a$1.

Figure 3A:
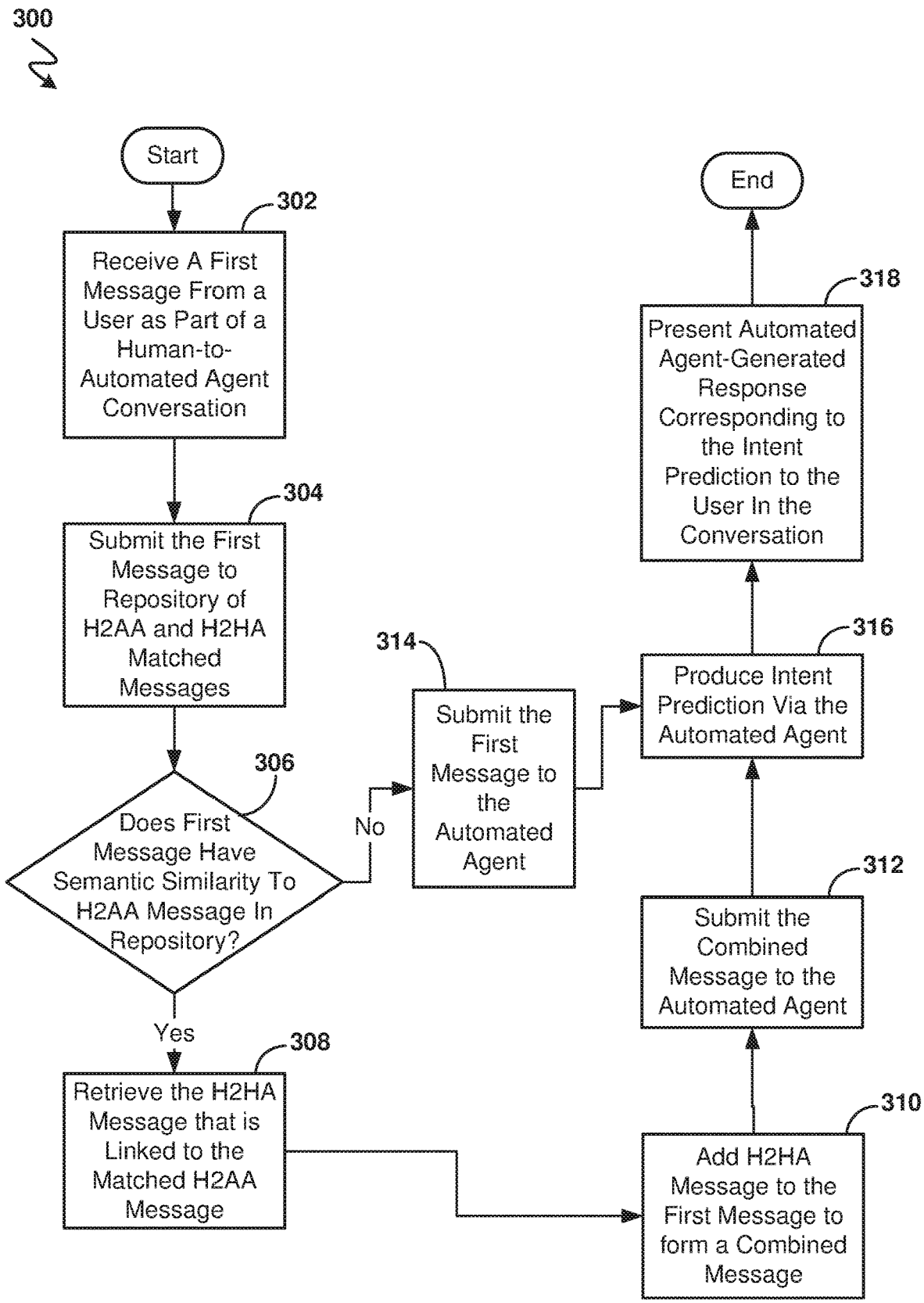
FIG. 3A is an operational flowchart illustrating a message enhancement process according to at least one embodiment that may use a repository created in the process illustrated in FIG. 2A.

The second server 122 may be used to perform a message enhancement process 300 that is depicted in FIG. 3A and will be described subsequently. This message enhancement process 300 may be used to enhance a message that is provided by a subsequent human who is using the second user computer 102$a$2 and is engaging in an unmanned dialogued with an automated agent based at the first server 112 with the dialogue program 110$b$. The second server 122 may receive and/or intercept a message that is provided by this other human and enhance this message so that when the enhanced message is received by the automated agent at the first server 112 the automated agent is better able to interpret and appropriately respond to the message (because the message is enhanced). Although FIG. 1 depicts two servers, namely the first server 112 and the second server 122, in some embodiments the message enhancement program 120, the natural language processor 128, and the escalated conversation repository 125 may be within the same server in which the automated agent embodied by the dialogue program 110b—automated agent side resides, e.g., may also be within the first server 112.

The networked computer environment 100 may include many computers and many servers, although three computers and two servers are shown in FIG. 1. The communication network 116 allowing communication between the first user computer 102a1, the second user computer 102a2, the first server 112, the second server 122, and the human agent computer 132 may include various types of communication networks, such as the Internet, a wide area network (WAN), a local area network (LAN), a telecommunication network, a wireless network, a public switched telephone network (PTSN) and/or a satellite network.

It should be appreciated that FIG. 1 provides only an illustration of one implementation and does not imply any limitations with regard to the environments in which different embodiments may be implemented. Many modifications to the depicted environments may be made based on design and implementation requirements.

The communication network 116 may include connections, such as wire, wireless communication links, or fiber optic cables. Although two servers and are shown in the networked computer environment 100 shown in FIG. 1, the communication network 116 may itself include additional servers such as one or more network edge servers and one or more edge/gateway servers which may be enabled to run or assist in operation of the escalated conversation gathering process 200, the message enhancement process 300, and the alternative message enhancement process 370. The communication network 116 may in some embodiments be or include high speed networks such as 4G and 5G networks. Implementing the present escalated conversation gathering process 200, the message enhancement process 300, and the alternative message enhancement process 370 in a 5G network will enable at least some embodiments to be implemented on the edge in order to boost network performance.

The first user computer 102a1 may include a first processor 104a1, a first data storage device 106a1, and a first software program 108a1. The first software program 108a1 may be stored on the first data storage device 106a1. The first processor 104a1 may access the first data storage device 106a1 and thereby actuate the first software program 108a1. The dialogue program 110a1 may be an example of the first software program 108a1 that is stored on the first data storage device 106a1 and executable via the first processor 104a1. The dialogue program 110a1 may facilitate communication with an automated agent and may include the generation of a textbox/chatbox, a voice communication platform, and/or a video communication platform. The dialogue program 110a1 may also implement speech-to-text transcription for audio conversations and sign-to-text transcription for sign language conversations so that text instead of audio/video files need to be transmitted over the communication network 116. The dialogue program 110a1 may implement natural language processing and/or other artificial intelligence to achieve such transcriptions in order to change from spoken language and/or signed language to text and vice-versa. Conversely, the dialogue program 110a1 may also implement text-to-speech transcription and text-to-sign transcription to allow any audio and/or sign language messages received from a human agent to be changed to text for convenience of understanding/reading for the human at the first user computer 102a1.

The above description provided for the first user computer 102a1 and its components and connections also applies equivalently to the second user computer 102a2 and its components and/or software, namely the processor 104a2, the data storage device 106a2, the software program 108a2, and the dialogue program—customer side 110a2. An example of usage of this second user computer 102a2 will be described for the embodiments shown in FIGS. 3A-3C and described herein.

The first server 112 may store and be able to run the dialogue program 110b for the automated agent side. The first server 112, may include a processor, a conversation repository 115, and a natural language processor 118. Conversations that occur as part of the execution of the dialogue program 110a, 110b may be stored in data storage of the conversation repository 115 in the first server 112. The dialogue program 110b may invoke the natural language processor 118 in order to read and interpret the text received in messages from a human at the first or second user computer 102a1, 102a2 that are received as part of an unmanned dialogue (from the perspective of the automated agent). Such an automated agent-involved dialogue may occur between a human at the first user computer 102a1 and the dialogue program 110b at the first server 112 or between the same or another human at the second user computer 102a2 and the dialogue program 110b at the first server 112. The dialogue program 110b may also implement speech-to-text transcription for audio conversations and sign-to-text transcription for sign language conversations.

The second server 122 may store and be able to run the message enhancement program 120 which may enhance one or more messages that are being generated at a customer/user computer such as the second user computer 102a2 and being transmitted to the automated agent (dialogue program 110b—automated agent side) at the first server 112. Via the communication network 116 the message enhancement program 120 may intercept/receive these messages in order to enhance same. The second server 122 may include an escalated conversation repository 125 which includes data storage and which may host a subset of the conversations that are stored in the conversation repository 115. This escalated conversation repository 125 may in some instances also include a machine learning model that is trained via the inputting of escalated conversations that are identified. The escalated conversation gathering process 200 depicted in FIG. 2A may be performed on conversations from the conversation repository 115 in the first server 112 in order to gather conversations with matching requests, so that these conversations with matching requests may be saved in the escalated conversation repository 125. The second server 122 may include a second processor 124 which may be used to execute the message enhancement program 120. The second server 122 may include a natural language processor 128 in some embodiments to facilitate the execution of the message enhancement by the message enhancement program 120. The message enhancement program 120 may invoke the natural language processor 128 in order to read and interpret the text received in the intercepted message that is received for enhancement of same. The message enhancement program 120 may also implement speech-totext transcription for audio conversations and sign-to-text transcription for sign language conversations.

The reference to intercepting messages may be clarified in the notion that the organization who controls the automated agent may consciously consent to invoke the message enhancement program 120 in order to improve the ability of their automated agents to satisfy inquiries of humans. Thus, messages received or to be received by the dialogue program 110b at the first server 112 may be redirected, rerouted, transferred, and/or forwarded to the message enhancement program 120 at the second server 122 so that the incoming messages may be enhanced before being input into the automated agent, e.g., into the chatbot.

Figure 3B:
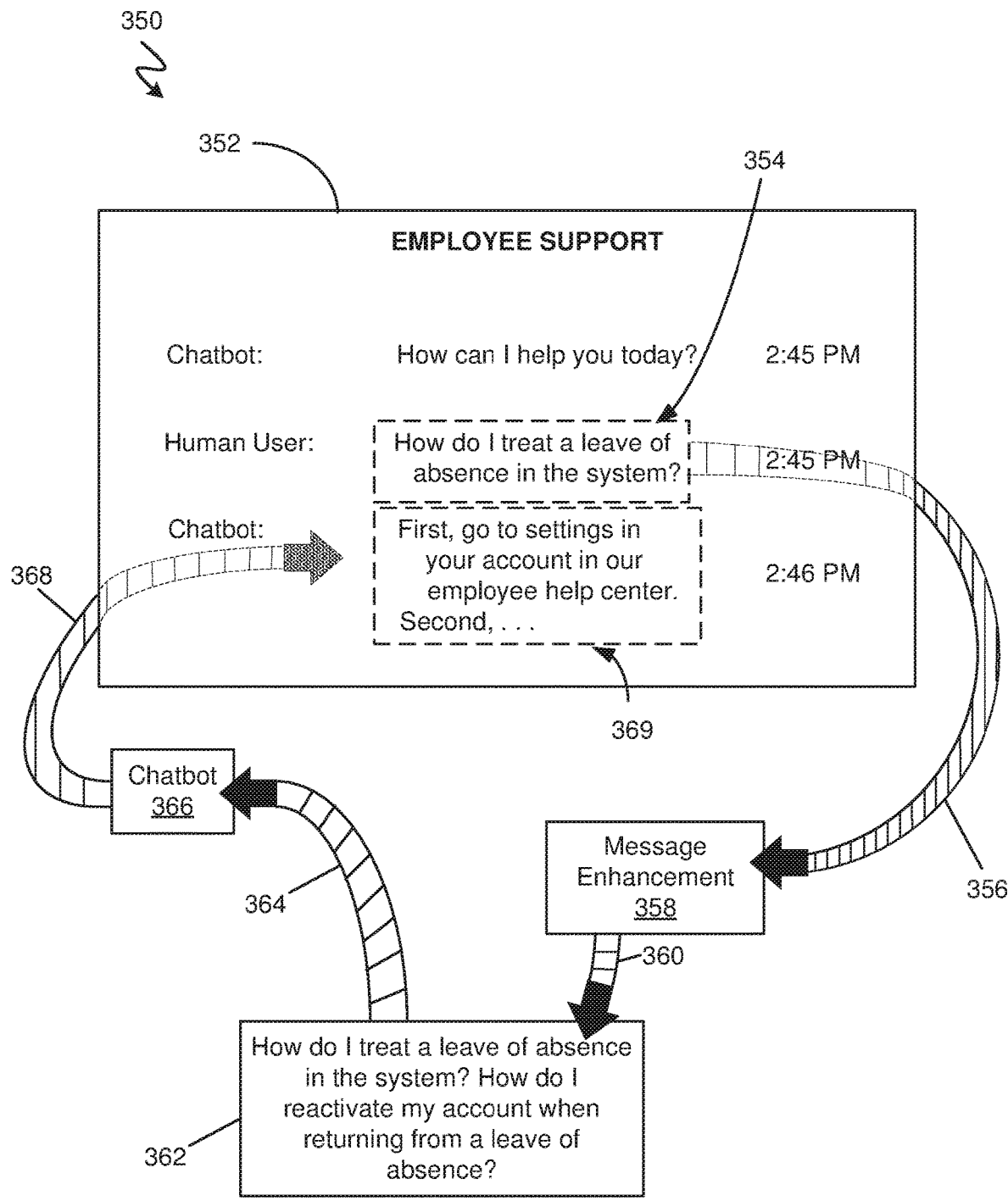
FIG. 3B illustrates a chatbot conversation which shows aspects of the message enhancement process of FIG. 3A or the alternative message enhancement process of FIG. 3C according to at least one embodiment.
Figure 3C:
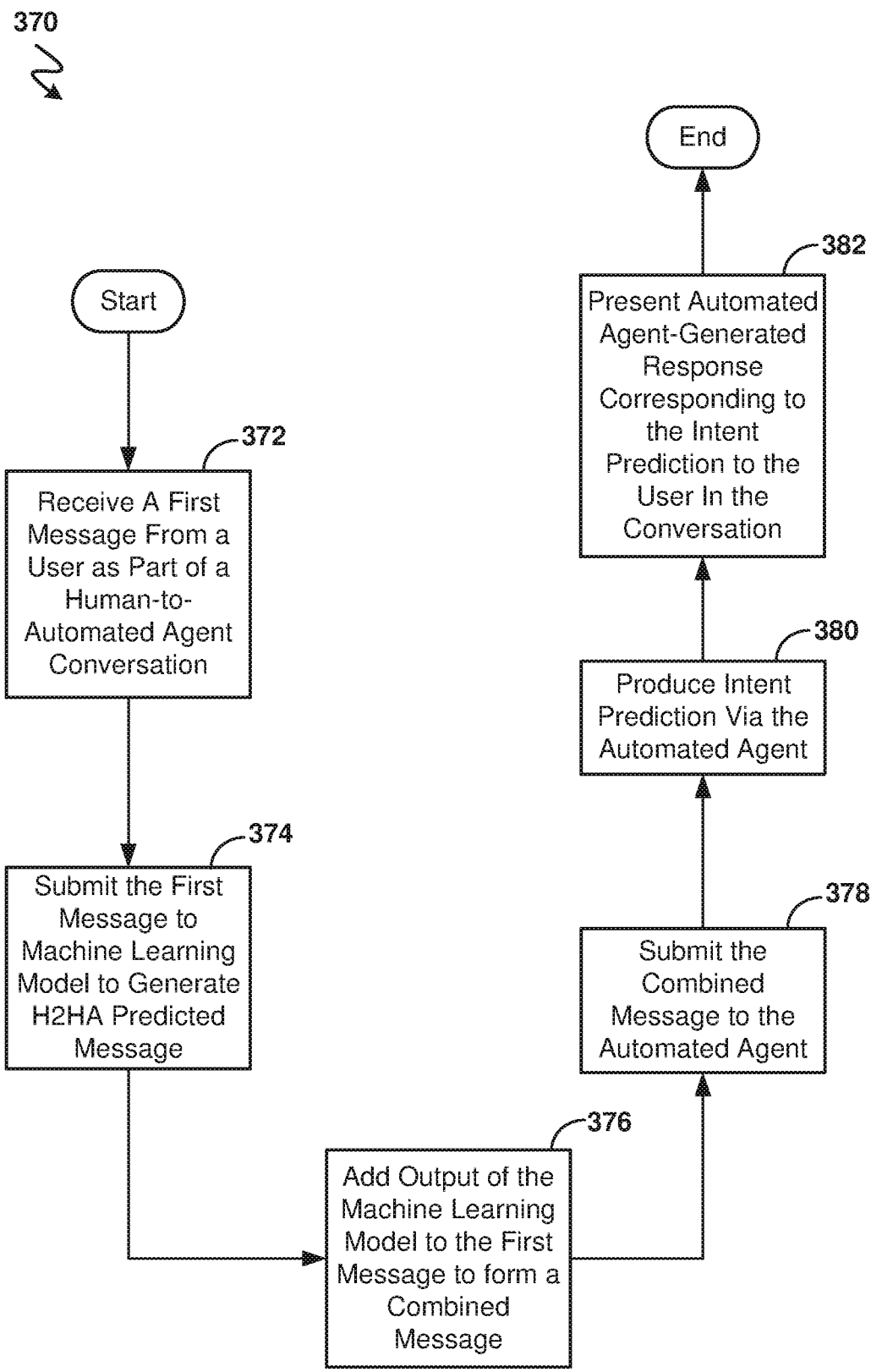
FIG. 3C is an operational flowchart illustrating an alternative message enhancement process according to at least one embodiment that may use the data that was gathered in the escalated conversation gathering process illustrated in FIG. 2A.

The human agent computer 132 may store and be able to run the dialogue program 110c for the human agent side. The human agent computer 132 may be involved in escalated conversations that are part of the escalated conversation gathering process 200 that is depicted in FIG. 2A and described subsequently. A human agent may use the human agent computer 132 and specifically the dialogue program 110c to respond to inquiries of a human, e.g., at the first user computer 102a1, in instances when the automated agent (dialogue program 110b—automated agent side) at the first server 112 is unsuccessful in understanding the inquiry of the human or in effectively responding to the inquiry of the human. The human agent computer 132 and a human agent operating thereon are unnecessary and in at least most instances unused for performing the message enhancement process 300 that is depicted in FIG. 3A, the chatbot conversation 350 that is depicted in FIG. 3B, and the alternative message enhancement process 370 that is depicted in FIG. 3C.

The human agent computer 132 may include a third processor 134 and a data storage device 136. A software program 138 such as the dialogue program 110c may be stored on the data storage device 136. The third processor 134 may access the data storage device 136 and therewith actuate the software program 138. The dialogue program 110c may be an example of a software program 138 that is stored on the data storage device 136 and executable via the third processor 134. The dialogue program 110c may facilitate communication with the human agent and may include the generation of a textbox/chatbox, a voice communication platform, and/or a video communication platform. The dialogue program 110c may also implement speech-to-text transcription for audio conversations and sign-to-text transcription for sign language conversations so that text instead of audio/video files may be transmitted over the communication network 116. Conversely, the dialogue program may also implement text-to-audio conversion and/or text-to-sign (with video) conversion to allow a human agent to intervene who relies on audio and/or sign language (video) for communication.

Figure 4:
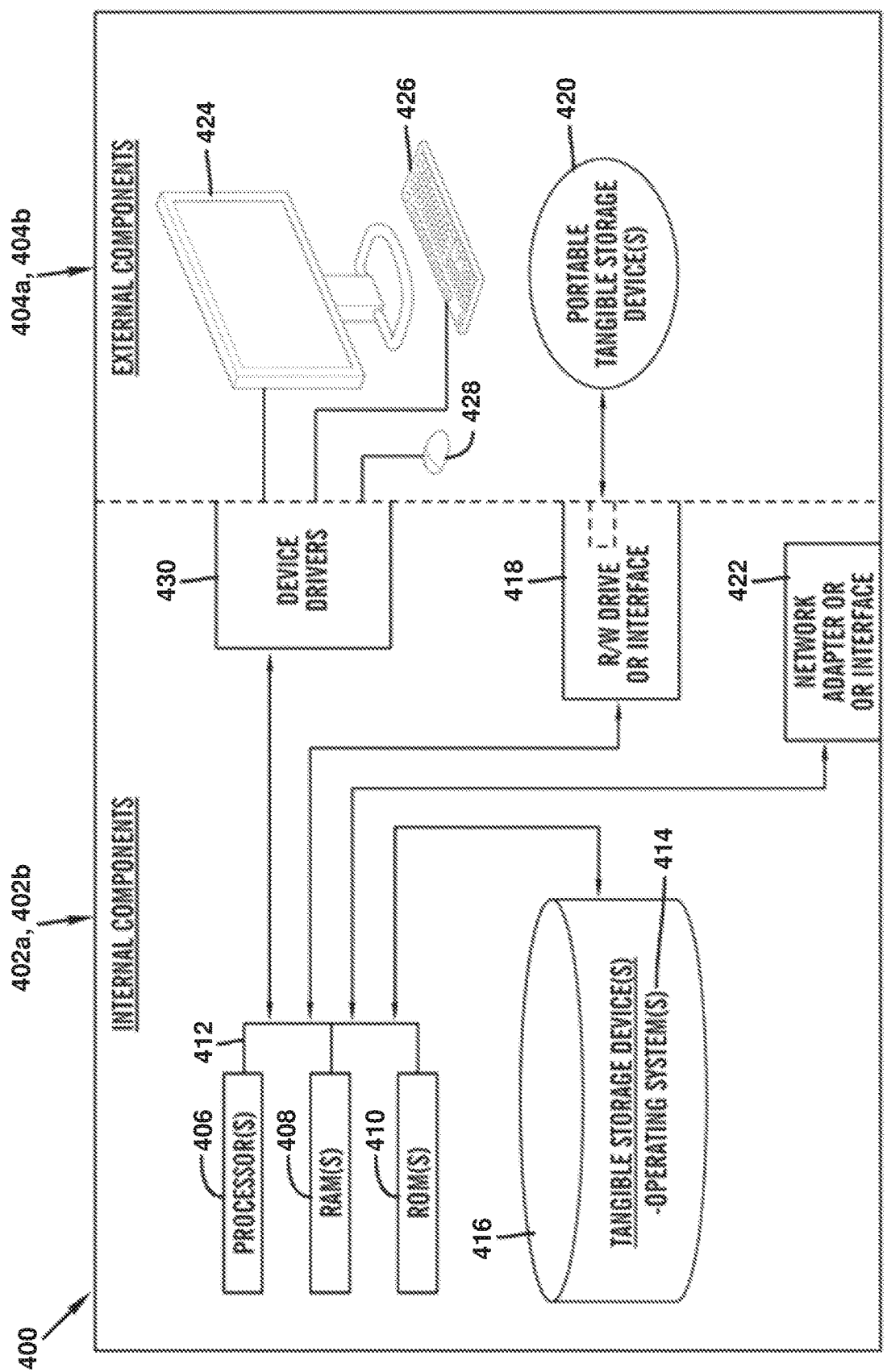
FIG. 4 is a block diagram of internal and external components of computers and servers depicted in FIG. 1 according to at least one embodiment.

As will be discussed with reference to FIG. 4, the first server 112 and the second server 122 may each include internal components 402a and external components 404a, respectively. The first user computer 102a1, the second user computer 102a2, and the human agent computer 132 may also each include internal components 402b and external components 404b as depicted in FIG. 4. The first and the second servers 112, 122 may also operate in a cloud computing service model, such as Software as a Service (SaaS), Platform as a Service (PaaS), or Infrastructure as a Service (IaaS). The first and the second servers 112, 122 may also be located in a cloud computing deployment model, such as a private cloud, community cloud, public cloud, or hybrid cloud. The first user computer 102a1, the second user computer 102a2, and the human agent computer 132 may each be, for example, a mobile device, a telephone, a personal digital assistant, a netbook, a laptop computer, a tablet computer, a desktop computer, or any type of computing devices capable of running a program, accessing a network, and communicating with the other and/or with another server, e.g., the first and/or second server 112, 122, that is remotely located with respect to the former. The first user computer 102a1, the second user computer 102a2, and the human agent computer 132 may each include a display screen, a speaker, a microphone, a camera, and a keyboard or other input device for enabling better communication of a human who is participating in a customer inquiry conversation as the customer or as a human agent. According to various implementations of the present embodiment, the message enhancement program 120 may interact with an escalated conversation repository 125 and with a conversation repository 115 that may be embedded in various storage devices, such as, but not limited to a various computers/mobile devices, the first server 112 and/or the second server 122 that may be in a network, or another cloud storage service.

Usage of storing content on edge servers may reduce network traffic that is required for execution of a customer inquiry between a human customer and an automated agent as described herein. This reduction in network traffic may help achieve efficient processing for execution of the methods according to the present embodiments. As a customer may engage in this conversation at the first user computer 102a1 and/or at the second user computer 102a2, the customer, the automated agent at the first server 112, and the message enhancement program 120 at the second server 122 may utilize their network infrastructure to gain appropriate connectivity, e.g., 5G connectivity, into the environment. The present embodiments may take advantage of existing and future 5G infrastructure and their increase of bandwidth, latency, and scaling of applications requiring large amounts of real-time data. The first and the second server 112, 122 may trigger data and command flows to be processed by distributed programs that are available at one or more network edge servers located at a network edge and/or that are available at a respective edge/gateway server located at a network gateway.

A computer system with the message enhancement program 120 operates as a special purpose computer system which may help perform the message enhancement process 300 and the alternative message enhancement process 370 for enhancement of a message to facilitate understanding by an automated agent. In particular, the message enhancement program 120 transforms a computer system into a special purpose computer system as compared to currently available general computer systems that do not have the message enhancement program 120 installed thereon.

Instead of being disposed in a separate server, namely in the second server 122, as is shown in FIG. 1, the message enhancement program 120 may alternatively be implemented as a software plugin component on one, some, or all of the first user computer 102a1, the second user computer 102a2, and the first server 112 between which a human and an automated agent are engaged in a conversation. A reduction in network transmission amounts may be reduced if the message enhancement program 120 is disposed within the first server 112 and/or within the various user computers such as the first and second user computers 102a1, 102a2 which use the dialogue program 110a from the customer side or from an employee side for dealing with their employer organization.

Referring now to FIG. 2A, an operational flowchart depicts an escalated conversation gathering process 200 that may, according to at least one embodiment, be performed using the message enhancement program 120. The message enhancement program 120 may perform the escalated conversation gathering process 200 by engaging the dialogue program 110a1, 110a2, 110b, 110c. This escalated conversation gathering process 200 may help generate a message enhancement library which includes rephrased messages. The message enhancement library may include escalated conversations which have matching requests for a human-to-automated agent conversation portion and a human-to-human agent conversation portion. The message enhancement library, the requests, and/or the matching conversation portions may be stored in the escalated conversation repository 125 in the second server 122, namely in the server in which the message enhancement program 120 is stored. The reworded or rephrased messages may be used to help enhance messages as part of the message enhancement process 300 that is depicted in FIG. 3A. The rephrased messages may also be used to train a machine learning model that may be used to help enhance messages as part of the alternative message enhancement process 370 that is depicted in FIG. 3C. The escalated conversation gathering process 200 helps identify good pairs of human-to-automated agent and human-to-human agent conversations by using factors such as whether the two portions came from the same conversation and/or from the same user.

Figure 2B:
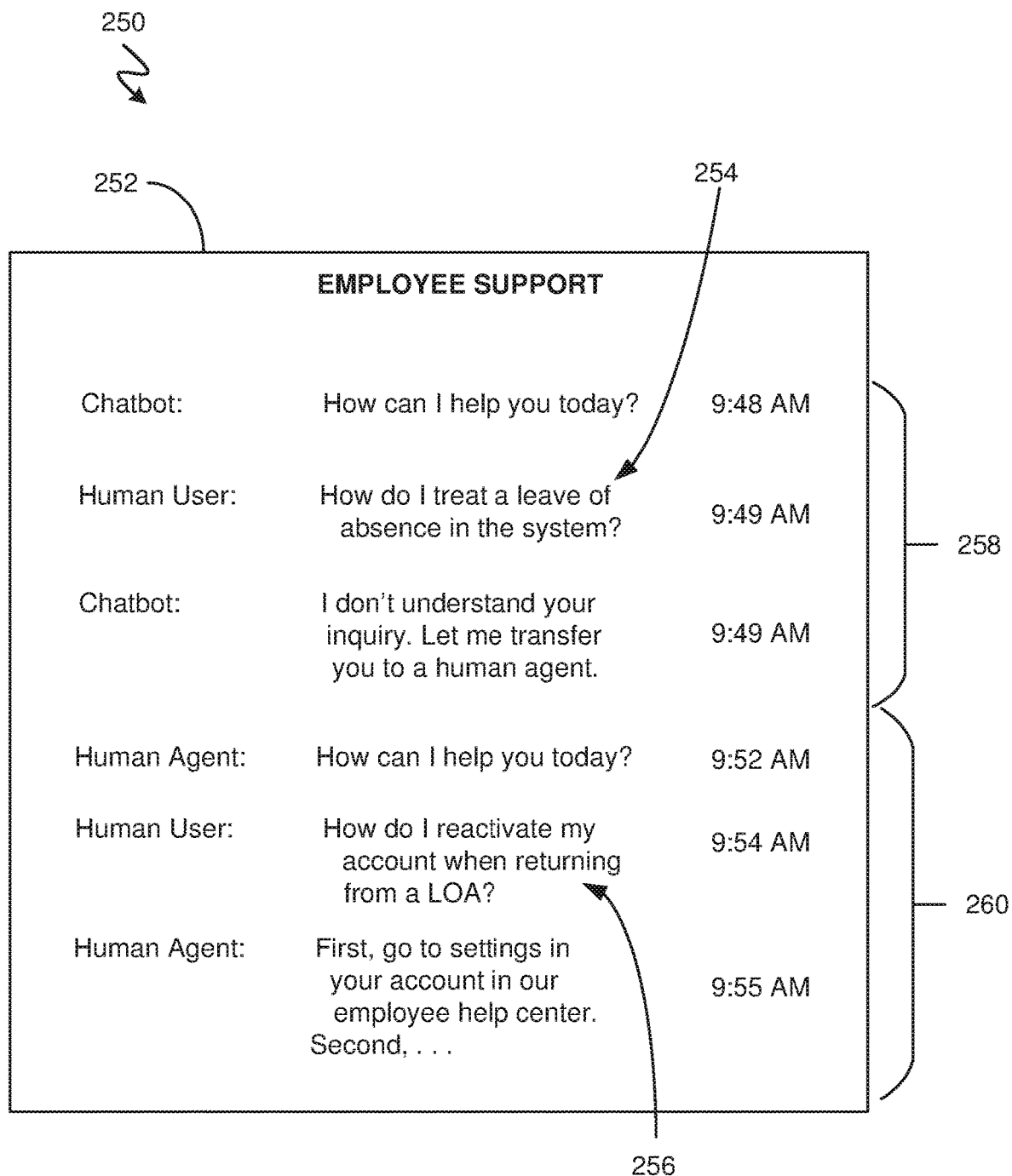
FIG. 2B illustrates a chatbot conversation which shows an escalated conversation which may be involved in the escalated conversation gathering process of FIG. 2A according to at least one embodiment.

In a step 202 of the escalated conversation gathering process 200, a set of conversations between users and automated agents is obtained. These conversations may have occurred via the particular dialogue program 110a1, 110b, 110c shown in FIG. 1 on the first user computer 102a1, the first server 112, and the human agent computer 132, respectively. The dialogue program 110a1, 110b, 110c may store each message that is generated and transmitted in local data storage and/or in cloud storage, e.g., in the conversation repository 115 in the first server 112. As the effectiveness of the various embodiments is increased with more data, the conversations obtained in step 202 may include those that come from many different humans which communicate with an automated agent, e.g., with the dialogue program—automated agent side 110b, using a respective computer. For simplicity sake the escalated conversation gathering process 200 will be described with a specific example that relates to a user at the first user computer 102a1. For additional supplementation of the conversation collection, other conversations between automated agents and humans and between human agents and humans may be recorded elsewhere and added as a supplement to the conversation repository 115 to supplement the conversations generated with those computers shown in FIG. 1. As a default for facilitating the escalated conversation gathering process 200 an automated agent may record all messages that the automated agent receives, generates, and/or sends as part of conversations with one or more humans. FIG. 2B which will be described subsequently shows an example of an escalated conversation 250 which may be included in an initial set of conversations that is obtained in step 202.

A human may in at least some embodiments initiate a conversation with an automated agent by visiting a website of an organization and actuating a feedback link within the website. The website may then actuate a conversation platform that enables a conversation via text messages, audio messages, and/or sign language messages between the human and an automated agent. Thus, the dialogue program 110a1, 110a2, 110b, 110c may be incorporated into software of a website. The website may generate one or more graphical user interfaces, e.g., with a textbox, to facilitate the human engaging the automated agent in conversation. FIG. 2B shows an example of an escalated conversation 250 in which a human first converses with a chatbot and subsequently converses with a human agent.

The conversations that are saved may be stored in a data group of individual exchanges of messages. The conversations may be stored with each particular conversation from a beginning of the conversation to an end of the conversation, until the human exits the conversation, e.g., exits the chat. An entire conversation may include an escalated portion that occurs because an automated agent was unable to satisfy and/or understand the human so that the conversation was escalated to a human agent. The escalated conversation 250 shown in FIG. 2B includes a beginning portion 258 between a human and a chatbot and then an escalated portion 260 between the same human and a human agent. A human who works for and/or represents the organization may operate the dialogue program 110c at the human agent computer 132 to communicate with a human at the first user computer 102a1 if the automated agent of the dialogue program 110b at the first server 112 is unable to understand and/or satisfy the inquiry of the human at the first user computer 102a1. This portion of a conversation after the human agent is brought in may be referred to as an escalated portion 260 and may be part of the set of conversations that is obtained in step 202.

A default setting for the dialogue program 110a1, 110a2, 110b, 110c may be that each conversation is recorded for the purposes of enhancing the performance of the automated agent. Additionally and/or alternatively, the dialogue program 110a1, 110a2, 110b, 110c may request, via a graphical user interface, consent from the human for permission to record the conversation for the purposes of training and enhancing the automated agent and the ability of the automated agent to understand messages from a human.

The conversation content that is obtained may be stored in memory that is part of the dialogue program 110a1, 110a2, 110b, 110c and/or that is accessible to the dialogue program 110a1, 110a2, 110b, 110c. For example, conversations may be saved in the conversation repository 115 shown in FIG. 1, in the RAM 408 that is shown in FIG. 4, in memory of a server within and connected to the communication network 116, and/or in other memory in one or more remote servers that are accessible to the dialogue program 110a1, 110a2, 110b, 110c via the communication network 116 and/or via a wired connection.

In a step 204 of the escalated conversation gathering process 200, a subset of the conversations is identified. Each conversation in the subset was not resolved by the automated agent, so the conversation was escalated to a human agent. This identification of a subset of conversations of step 204 may occur by searching through the set of conversations that was obtained in step 202. Each conversation in the set of conversations obtained in step 202 may be tagged with the names of the participants and with an outcome of the conversation. For example, each conversation may be tagged to indicate the computer identity, e.g., an IP address, of the human who is chatting with the automated agent. For the embodiment shown in FIG. 1, the tag may indicate the IP address of the first user computer 102a1 or of the second user computer 102a2. When the set contains conversations from various automated agents, the identity of the particular automated agent involved for a particular conversation may be part of tags for the saved conversation data. This adding of such tags to the conversations may also occur in an automated manner by the program analyzing which parties participated in the conversation. If the conversation required an escalation to a human agent, the participants and tags may include a third identity, namely the identity of the human agent. The identity may be the IP address of the computer of the human agent, e.g., the IP address of the human agent computer 132 that is shown in FIG. 1.

The identification of step 204 may include filtering out any conversation which from the conversation beginning to the conversation end did not include a human agent. Each conversation with a human agent tag may be selected out to be placed in the subset for step 204. Thus, the identification of step 204 may in some embodiments include text searching via tag reading and text comparison via a comparator that may be part of the message enhancement program 120 and/or part of the dialogue program 110a1, 110a2, 110b, 110c.

In a step 206 of the escalated conversation gathering process 200, the user request is identified for each human-to-automated agent portion in the subset. The subset refers to the subset of conversations that was identified in step 204 and which included an escalation of the conversation to a human agent. Step 206, relates, however, to an initial portion of the conversation before the conversation was escalated to the human agent. For example, for the escalated conversation 250 shown in FIG. 2B step 206 relates to the beginning portion 258. Step 206 helps identify a purpose of the message which the human, e.g., customer, initially sends to the automated agent, e.g., from the dialogue program 110a1 of the first user computer 102a1 to the dialogue program 110b (automated agent) of the first server 112.

A conversation portion, e.g., message, may include some fluff elements as well as some substantive user utterances. This user request identification of step 206 may include filtering out some or all of the fluff elements that may be a part of the human-to-automated agent portion of the conversation. The fluff elements may include trivial or superficial conversation elements and may include all salutations. An automated agent may easily understand and appropriately respond to words such as "hello", "hi", "hey", "greetings", "thumbs", "morning", "afternoon", "my", "name", "is", "live", "chat", and "thanks" which may be examples of fluff elements in a message. The identification of step 206 is part of a larger filtering to find conversations for which the automated agent needs to help for understanding and responding. The larger filtering may include steps 208, 210, and 212 of the escalated conversation gathering process 200. This filtering helps find those conversations which may challenge an automated agent to understand the human-generated message and to effectively respond to same. The identification of step 206 may include identifying a first user utterance in the conversation portion which is not a fluff element. A text comparator that is part of the message enhancement program 120 may analyze text of each word in a beginning portion 258 to look for matches of words in a list of fluff elements. If a beginning portion 258 exists that is made up entirely of fluff elements, this conversation portion may be discarded as being unsuitable for usage in the escalated conversation repository 125 and for usage in the message enhancement process 300.

The first user utterance in the message that is not a fluff element may in at least some instances itself be considered a user request for the conversation portion. The identification of step 206 may include identifying multiple user requests within a single conversation portion, whereby each of the user requests is not filtered out as being a fluff element.

This identification of step 206 may be performed by the message enhancement program 120 at the second server 122.

In a step 208 of the escalated conversation gathering process 200, the user request is identified for the corresponding human-to-human agent portion of the escalated conversation. This human-to-human agent conversation portion may at least in some embodiments come from the same conversation that started in the human-to-automated agent conversation that was analyzed in step 206. When the automated agent did not understand or resolve the inquiry of the human, the conversation was then escalated to a human agent, e.g., a human using the human agent computer 132. Step 208 relates, therefore, to a latter portion of the escalated conversation, e.g., to a user message that is generated after the conversation was escalated to the human agent. The escalated conversation 250 shown in FIG. 2B includes an escalated portion 260 that shows a conversation between a human user and a human agent and that occurs after the beginning portion 258. Step 208 helps identify a purpose of the message which the human, e.g., customer, sends to the human agent, e.g., from the dialogue program 110a1 of the first user computer 102a1 to the dialogue program 110c of the human agent computer 132.

A conversation portion, e.g., message, may for this human-to-human agent portion include some fluff elements as well as some substantive user utterances. This user request identification of step 208 may include filtering out some or all of the fluff elements that may be a part of the human-to-human agent portion of the conversation. The fluff elements may be defined, analyzed, and filtered out in the same way that they are for the analysis of the beginning portion 258 as a part of step 206. An automated agent may easily understand and appropriately respond to words such as "hello", "hi", "hey", "greetings", "thumbs", "morning", "afternoon", "my", "name", "is", "live", "chat", and "thanks" which may be examples of fluff elements in a message. This identification of step 208 is part of a larger filtering to remove conversations for which the automated agent needs no help for understanding and responding and thereby leave those conversations that include an escalated conversation. This larger filtering may also include steps 206, 210, and 212 of the escalated conversation gathering process 200. This filtering helps find those conversations which may challenge an automated agent to understand and to effectively respond to a human-generated message. The identification of step 208 may include identifying a first user utterance which is not a fluff element in this escalated portion 260. If this conversation portion is made up entirely of fluff elements, this conversation portion and/or this conversation may be discarded as being unsuitable for usage in the escalated conversation repository 125.

The first user utterance in the human-to-human agent message that is not a fluff element may in at least some instances itself be considered a user request for this conversation portion, e.g., for this escalated portion 260. The identification of step 208 may include identifying multiple user requests within this single conversation portion, e.g., of this escalated portion 260, whereby each of the user requests is not filtered out as being a fluff element.

This identification of step 208 may be performed by the message enhancement program 120 at the second server 122.

For steps 206 and 208, in some embodiments the identified non-fluff utterance itself may be the request. In other embodiments, the identified non-fluff utterance may be input into a lookup table, a decision tree, and/or a machine learning model to obtain output which identifies the user request. In some embodiments the set of identified non-fluff utterances in the analyzed messages constitutes the user request. In other embodiments, a single message may include multiple user requests that correspond, respectively, to multiple utterances. For the embodiment shown in FIG. 2B, the user request of the initial message 254 may be "leave of absence" help. The user request of the rephrased message 256 may be "account reactivation". At this point the identified user request for the rephrased message 256 may in some embodiments not incorporate the meaning of the acronym "LOA" because a machine learning model or an automated agent may at the time of this analysis be unfamiliar with the acronym.

In a step 210 of the escalated conversation gathering process 200, the first identified user request is compared to the second identified user request. The first identified user request may refer to the user request that was identified in step 206 for the human-to-automated agent conversation portion. The second identified user request may refer to the user request that was identified in step 208 for the human-to-human agent conversation portion. This comparison of step 210 may be performed by the message enhancement program 120. This comparison may include a text comparison as well as a semantic similarity comparison. The text comparison may be performed via a comparator of the message enhancement program 120. For the semantic similarity comparison, the requests may also be converted via natural language processing into word-based vectors and the vectors may be compared. Vectors that are sufficiently close to each other, e.g., closer than a pre-determined threshold, may be considered to be semantic matches.

In a step 212 of the escalated conversation gathering process 200, a determination is made as to whether the similarity is greater than a pre-defined threshold. If the determination is affirmative and the similarity is greater than a pre-defined threshold, the escalated conversation gathering process 200 proceeds to step 214. If the determination is negative and the similarity is less than a pre-defined threshold, the escalated conversation gathering process 200 proceeds to step 216. The pre-defined threshold may in some embodiments be chosen by an organization manager and may include weighted factors that emphasize accuracy and/or allowing a greater variety of message inputs to be handled. The similarity that is analyzed for step 212 may be generated in the comparison of step 210.

In a step 214 of the escalated conversation gathering process 200, the conversation is added to the repository for future intent detection enhancement. Because the conversation is deemed to be suitable to help for message enhancement in future human-to-automated agent conversations, the conversation may be added into the escalated conversation repository 125 which may constitute the repository for future intent detection enhancement. The conversation may be stored in the escalated conversation repository 125 in a manner such that the rephrased message 256 and/or its user request is linked to the initial message 254 and/or its user request. In some embodiments, the escalated conversation repository 125 may function as a lookup table.

In a step 216 of the escalated conversation gathering process 200, the conversation is not added to the repository for future intent detection enhancement. This step 216 occurs for those conversation portions which did not have the user request similarity that was greater than the pre-determined threshold as determined in step 212. This conversation may continue to be saved in the conversation repository 115 or may be deleted from the conversation repository 115. Because this conversation is deemed to be unhelpful for message enhancement in future human-to-automated agent conversations, the conversation is not added into the escalated conversation repository 125 which constitutes the repository for future intent detection enhancement. Also this conversation may in other embodiments not be used to train a machine learning model which predicts human-to-human phrasing based on receiving a human-to-automated agent message. These weeded-out conversations may in some instances include message portions which are all or primarily fluff elements.

FIG. 2B illustrates a chatbot conversation which shows an escalated conversation 250 which may be involved in the escalated conversation gathering process 200 of FIG. 2A according to at least one embodiment. FIG. 2B shows a textbox 252 that may appear on the display screen of the computer of the human, e.g., may appear on a display screen of the first user computer 102a1. Within the textbox 252 messages are shown which are part of a conversation as the human seeks to gain technical support, first from an automated agent, namely a chatbot, and second from a human agent. The human at the first user computer 102a1 may type a keyboard or other input device connected to the first user computer 102a1 which causes an initial message 254 to be displayed on the screen of the first user computer 102a1. This initial message 254 may inquire for help from a chatbot about how to treat a leave of absence in the system. In this example, the chatbot may be set up by a company which seeks to provide advice, e.g., human resource (HR) advice, to their own employees about how to handle various employment issues such as a leave of absence.

The escalated conversation 250 includes a beginning portion 258 in which the chatbot communicates with the user. This chatbot may be embodied by the dialogue program—automated agent side 110b at the first server 112 as shown in FIG. 1. In this example, the chatbot does not understand the inquiry, e.g., the initial message 254, of the human and, therefore, notifies a human agent that the human agent should try to respond to the inquiry of the human.

The escalated conversation 250 transfers, thereby, from the beginning portion 258 to an escalated portion 260 in which a human agent, instead of the chatbot, from the company/organization communicates with the user. The human agent may in the example depicted in FIG. 1 be using the dialogue program—human agent side 110c at the human agent computer 132 to provide information for a conversation with the human at the first user computer 102a1. The human agent may type into a keyboard connected to the human agent computer 132 in order to generate a message to the user/customer. When the human agent engages the human, the human provides a rephrased message 256 via the first user computer 102a1 in order to seek guidance about how to procedurally respond and/or record a change in work status, in this instance that the worker has returned from a leave of absence. As compared to the initial message 254, the rephrased message 256 is more precise, is clearer, and helps the human agent know more specifically what help the human wants. This rephrasing may occur unintentionally by the human but nevertheless occurs frequently for such escalated conversations. The human agent responds to the rephrased message 256 by providing an answer with some specific steps of how the user can reactivate their account when the user returns from a leave of absence.

By carrying out the escalated conversation gathering process 200 on the escalated conversation 250, the message enhancement program 120 determines that this escalated conversation 250 provided a valuable rephrasing for the purposes of enhancing future incoming messages. Thus, the pair of the initial message 254 and the rephrased message 256 would be suitable for storage for future use by the message enhancement program 120 in order to enhance a future initial message that is provided to an automated agent such as a chatbot. This message pair and their user requests may be stored in the escalated conversation repository 125 in order to be available to the message enhancement program 120 to enhance a future initial message that is received by the chatbot.

The escalated conversation gathering process 200 has a natural repeat of steps 206, 208, 210, and 212 and 214 or 216 for each of the escalated conversations within the subset that is identified in step 204. Through this repeating and optionally through performing the escalated conversation gathering process 200 for other sets and subsets, the escalated conversation repository 125 may eventually contain hundreds, thousands, hundreds of thousands, or more matched messages/escalated conversations. This large number may be based on the number of times that the escalated conversation gathering process 200 was repeated and the number of conversations that were fed into the escalated conversation gathering process 200. The greater the length of time over which such possible conversations were gathered may result in an increase of the number of escalated conversations which were added to this repository in the escalated conversation gathering process 200.

A dialog may be denoted by $A:=(u\_1, u\_2, \ldots, u\_n)$ and may include ordered utterances that are indicated by u_i. Each utterance in the dialog may be created by an automated agent (e.g., a bot), a human, or a human agent. The sets of utterances by the bot, human, and human agent may be denoted by UB, U, and UH, respectively. F may denote a set of predetermined fluff words and phrases such as 'hello', 'hi', 'hey', 'greetings', 'thumbs', 'morning', 'afternoon', 'my', 'name', 'is', 'live', 'chat', and 'thanks'. Given a human-to-bot conversation A_b and its continued human to bot escalation conversation A_h the two corresponding user requests may be extracted. An extraction heuristic may include finding the first user utterance in the human-to-bot conversation A_b that is not fluff. This first user utterance may be denoted as r_b. The extraction heuristic may further include finding the first user utterance in the human-to-human agent conversation A_h that is not fluff. This first user utterance may be denoted as r_h. If the similarity of r_h and r_b is greater than (>) a minimum similarity parameter, then the two requests may be returned for use in the message enhancement dataset and for storage in the escalated conversation repository 125. The message enhancement dataset may alternatively be used to train a machine learning model that predicts messages phrased for a human recipient based on the input of a message that was given to an automated agent recipient. If the conversations do not include an utterance that satisfies the condition, then this escalated conversation is not added to the message enhancement dataset. This heuristic may be used to extract from a dataset with multiple conversations multiple request pairs that may subsequently be used for enhancing messages that are incoming to an automated agent/bot.

The message enhancement program 120 may perform various aspects of natural language processing in order to carry out various aspects of the escalated conversation gathering process 200 such as those steps involved with identifying the requests of the conversation portions. The natural language processing may include entity extraction which extracts named entities from the text and classifies them into predefined categories. The entities may be deemed as non-fluff portions. The message enhancement program 120 may also use natural language processing to extract verbs from the various messages in order to identify the request/intent of the user inquiry.

FIG. 3A depicts an operation flowchart illustrating a message enhancement process 300 according to at least one embodiment. The message enhancement process 300 may access a repository created in the escalated conversation gathering process 200 that was illustrated in FIG. 2A and described previously. To help illustrate some of the steps of the message enhancement process 300, FIG. 3B illustrates a chatbot conversation 350 which is one example of the message enhancement process 300 being implemented.

In step 302 of the message enhancement process 300, a first message is received from a first user as part of a human-to-automated agent conversation. This first message may be generated by a user using the dialogue program 110a2 at the second user computer 102a2 shown in FIG. 1. Although this first message may be produced from any user computer that is engaging the automated agent and could even be produced by the first user computer 102a1 which was described as being involved for the escalated conversation gathering process 200, typically a single user will not seek out an automated agent and ask the automated agent the same question on different occasions. The computers shown as producing the various messages are examples of implementing the present embodiments and do not limit the various possible implementations of the present embodiments. This showing of both the first user computer 102a1 and the second user computer 102a2 helps illustrate how the prior conversations of one user with an automated agent may be used via the escalated conversation gathering process 200 and the message enhancement process 300 in order to help the automated agent better engage in conversation with another user at a subsequent time.

The message enhancement program 120 at the second server 122 may receive this first message for step 302. The dialogue program 110b may have a redirect feature so that incoming messages to the automated agent that is embodied via the dialogue program 110b—automated agent side are redirected over the communication network 116 to the message enhancement program 120. Such a redirecting, forwarding, or bypassing may enable the message enhancement program 120 to enhance the message before the message is submitted to the automated agent, e.g., the chatbot 366 (see FIG. 3B). The dialogue program 110a2 may also initiate this redirect. The message enhancement program 120 is shown as being in the second server 122 which is separate from the first server 112. In other embodiments, the message enhancement program 120 may be disposed within the first server 112 along with the dialogue program 110b—automated agent side.

FIG. 3B shows an example of a first message 354 being produced by a human as a part of the chatbot conversation 350. The user at the second user computer 102a2 may type in words in a keyboard connected to the second user computer 102a2 which produces words in a graphical user interface textbox 352. This graphical user interface textbox 352 may be generated when the user engages the dialogue program 110a2, e.g., when visiting the website of the employer and accessing an employee section and/or a feedback section. The first message 354 is shown in FIG. 3B. The receiving of the first message 354 by the message enhancement program 120 is indicated with the first transfer arrow 356 in FIG. 3B. This first transfer arrow 356 begins at the first message 354 in the graphical user interface textbox 352, symbolically runs in FIG. 3B, and ends at the message enhancement 358. The dotted lines of the first transfer arrow 356 while still within the area of the graphical user interface textbox 352 symbolize that this first transfer arrow 356 is not displayed on the display screen of the second user computer 102a2. Rather, this first transfer arrow 356 is shown for schematical purposes for FIG. 3B. This box in FIG. 3B for the message enhancement 358 symbolically represents several of the subsequent steps shown in FIG. 3A and described below for the message enhancement process 300 or alternatively several of the steps shown in FIG. 3C for the alternative message enhancement process 370.

In step 304 of the message enhancement process 300, the first message 354 is submitted to a repository of human-to-automated agent (H2AA) and human-to-human agent (H2HA) matched messages. This first message 354 may be that message that was received in step 302. This repository may be the escalated conversation repository 125 that is shown in FIG. 1 and may include those escalated messages that were gathered via the escalated conversation gathering process 200. For example, the escalated conversation repository 125 may contain the combination of the rephrased message 256 linked to the initial message 254 that was shown in FIG. 2B and described previously. The escalated conversation repository 125 may contain hundreds, thousands, hundreds of thousands, or more matched messages based on the number of times that the escalated conversation gathering process 200 was repeated and the number of conversations that were fed into the escalated conversation gathering process 200. For the embodiment shown in FIG. 1 with the message enhancement program 120 and the escalated conversation repository 125 both disposed in the second server 122, this submission of the first message 354 may occur via a transmission along the bus of the second server 122 from one memory storage area to another memory storage area within the second server 122. This step 304 of the message enhancement process 300 may be part of the message enhancement 358 that is shown in FIG. 3B.

Some embodiments may include an additional step between steps 304 and 306. This additional step may include an additional filtering step in which the first message is analyzed for its topic. After the topic of the first message is identified, the topic is compared to a list of topics that have been identified as being challenging for detecting user intent. An administrator for the message enhancement program 120 may provide this list. The subsequent steps of the message enhancement process 300 may be performed in response to the identified topic being in the list of topics that are challenging for detecting user intent. Thus, with this additional filtering the administrator of the automated agent/message enhancement program 120 may selectively choose to apply the message enhancement achieved by the message enhancement program 120 when those topics are being discussed which are likely to impose a special challenge for intent detection for the automated agent. This extra filtering step may also be applied in the alternative message enhancement process 370 that will be described subsequently and that is depicted in FIG. 3C. Similarly a gatekeeping step may be applied so that the message enhancement process 300 is applied for automated agents that are operating in a particular country or human language for/in which automated agents have had challenges in understanding incoming customer messages In step 306 of the message enhancement process 300, a determination is made as to whether the first message has semantic similarity to any human-to-automated agent message that is stored in the repository. If the determination of step 306 is affirmative and the first message matches one or more human-to-automated agent messages stored in the repository, the message enhancement process 300 then proceeds to step 308. If the determination of step 306 is negative and the first message does not match any human-to-automated agent message stored in the repository, the message enhancement process 300 then proceeds to step 314.

This determination of step 306 may be performed via calculating word vectors for the first message 354 and word vectors for the human-to-automated agent (H2AA) message portions that are stored within the repository and comparing the vector for the first message 354 with the vectors for the stored for the H2AA message portions. Thus, with this embodiment the message enhancement program 120 may include a language-based machine learning model that is able to generate a vector for various phrases, sentences, and paragraphs and to compare the calculated vectors. For natural language processing, a sentence may be represented as a vector of numbers based on the semantic meaning of each word in the sentence and the relationship of each word to the other words in the sentence. Two vectors that are close to each other may semantically be similar. For example if a user writes (r_b) "How to handle a parental leave in the system?", the closest semantic sentence in the repository may be "How to treat a leave of absence in the system?" Thus, the mapping (r_h) may be semantically close to "How to reactive my user when returning from LOA?" When using a language-based model such as a BERT or BERT-like system to generate the human-to-human request (r_h), the result of the sentence may be "How can I reactivate my user when I return from a parental leave of absence?"

This step 306 may alternatively determine whether the first message matches any human-to-automated agent that is stored in the repository. This matching may include performing a text comparison of the first message 354 with the human-to-automated agent message portions that are stored within the repository, e.g., within the escalated conversation repository 125. Thus, with this embodiment the message enhancement program 120 may include a comparator that is able to compare text and to use text comparison to navigate through a lookup table. The match may be an approximate match that is greater than a pre-determined threshold. The match may be a match of a word root instead of the entire word. The request or requests of the first message 354 may be compared with the stored messages to find the match. When multiple repository entries have a partial match, the repository entry with the greatest match percentage may be chosen so long as the percentage is larger than a pre-determined threshold. Statistical analysis may be used to determine a best match.

This step 306 of the message enhancement process 300 may be part of the message enhancement 358 that is shown in FIG. 3B.

In step 308 of the message enhancement process 300, the human-to-human agent message that is linked to the matched human-to-automated agent message is retrieved. The matched human-to-automated agent (H2AA) message may refer to that message that was identified in step 306. For the example of FIG. 2B, the beginning portion 258 is stored in the escalated conversation repository 125 in a manner so as to be linked to the escalated portion 260 which is also stored in the escalated conversation repository 125. Thus, if the human-to-automated agent message, e.g., the initial message 254 (from FIG. 2B and now in the repository), is a match in step 306 to the first message 354 (in FIG. 3B), the rephrased message 256 may be retrieved from the escalated conversation repository 125 due to the rephrased message 256 being linked to the initial message 254 in the escalated conversation repository 125. The rephrased message 256 would be the human-to-human agent (H2HA) message that is retrieved in step 308. This step 308 of the message enhancement process 300 may be part of the message enhancement 358 that is shown in FIG. 3B. In this embodiment, the escalated conversation repository 125 functions as a lookup table for semantically similar matches or word matches.

In step 310 of the message enhancement process 300, a human-to-human agent message is added to the first message to form a combined message, e.g., an enhanced message. This human-to-human agent message of step 310 may be that message that was retrieved in step 308. FIG. 3B shows a combined message 362 that was formed by combining the first message 354 with a retrieved escalated message, namely the rephrased message 256 shown in FIG. 2B but with a modification thereto. The modification included extending out the acronym "LOA" to read "leave of absence" to protect against a situation when an automated agent would not understand the acronym. Thus, the combined or enhanced message may in some embodiments include the retrieved message in a modified form for combining this message with the first message 354. The escalated conversation repository 125 may include an additional table of acronym meanings and may replace each acronym with the represented words in a retrieved message before adding the retrieved message to the first message 354 to form the combined message 362. FIG. 3B shows with the second transfer arrow 360 how the message enhancement 358 leads to the production of the combined message 362. The message enhancement program 120 at the second server 122 may perform this combining.

For instances when the automated agent includes a language-based machine learning model that incorporates BERT or a BERT-type model, the output may be concatenated to the end of the first message to form the combined message with a separator such as "$SEPERATOR$" between the original message and the added message. This addition of the separator may be based on requirement of the architecture used by the particular automated agent.

In a step 312 of the message enhancement process 300, the combined message is submitted to the automated agent. For the networked environment 100 shown in FIG. 1, this submission of step 312 may occur via a transmission of the combined message from the second server 122 to the first server 112 and particularly to the dialogue program 110b of the first server 112. The dialogue program 110b embodies the automated agent which in FIG. 3B is exemplified as the chatbot 366. In FIG. 3B, the third transfer arrow 364 symbolizes this submission of step 312 as the combined message 362 is submitted to the chatbot 366.

In a step 314 of the message enhancement process 300, the first message is submitted to the automated agent. This first message may receive to the message that was received in step 302. This step 314 occurs when no match was found in the escalated conversation repository 125 for the message that was received. In this instance, the message enhancement 358 does not take place and the message may be submitted as is to the automated agent, e.g., to the dialogue program 110b at the first server 112. This branch of the message enhancement process 300 allows the automated agent to continue to function (albeit with lower accuracy) even if the message enhancement process is not effective to enhance the received message, because the message enhancement program 120 did not find any way to enhance the message and be confident in the enhancement.

In a step 316 of the message enhancement process 300, an intent prediction is produced via the automated agent. This automated agent may be the automated agent to which the combined message was submitted in step 312 or to which the first message was submitted in step 314. The dialogue program 110b at the first server 112 may invoke one or more internal algorithms, decision trees, and/or machine learning models to predict the intent of the combined message that was received. The intent prediction may be based on pre-programmed organizational, informational, and/or transactional offerings that may be provided by the organization for which the automated agent is being implemented. The automated agent may itself include a lookup table or a machine learning model that allows it to provide a listed intent as output when a message or an enhanced message is input thereto. This production of an intent prediction is based on the pre-existing bot architecture. The message enhancement program 120 may operate without altering the pre-established bot architecture.

In a step 318 of the message enhancement process 300, an automated agent-generated response that corresponds to the intent prediction is presented to the user in the conversation. This intent prediction may be that intent prediction that was produced in step 316. FIG. 3B shows a chatbot response 369 which is an example of the automated agent-generated response for step 318. A data packet for producing this chatbot response 369 may be transmitted via the communication network 116 to the second user computer 102a2 so that the chatbot response 369 may be displayed on the display screen of the second user computer 102a2 within the graphical user interface textbox 352. The response may provide, for example, instructions to the user, a link to the user, a request for further information to the user, etc. The chatbot response 369 shown in FIG. 3B provides instructions to the user at the second user computer 102a2 for reactivating their account after the user employee returns from a leave of absence. In this example, the instructions of the chatbot response 369 include multiple steps for the user to take to perform this reactivation. The fourth transfer arrow 368 shown in FIG. 3B that starts at the chatbot 366 and ends at the chatbot response 369 symbolically represents this transmission of the generated message and the presentation to the user at the respective user computer. The dotted lines of the fourth transfer arrow 368 after entering into the graphical user interface textbox 352 symbolizes that this fourth transfer arrow 368 is not displayed on the display screen of the second user computer 102a2. Rather, this fourth transfer arrow 368 is provided for schematical purposes for FIG. 3B.

After the step 318, this iteration of the message enhancement process 300 may end. The message enhancement process 300 may be repeated for another human-to-automated conversation and, specifically, to another incoming first message from a human.

In some embodiments, the dataset of escalated messages that was gathered via the escalated conversation gathering process 200 depicted in FIG. 2A may be used to train a machine learning model. Via this training, the machine learning model may thereafter be used to predict a human-to-human agent message based on a human-to-automated agent message that is received and input into the machine learning model.

The machine learning model may be a language-based training model and may be trained in a similar way that language-translation machine learning models are trained. The machine learning model may be trained similarly, for example, as an English-to-Spanish translation machine learning model that is able to receive an English word, phrase, sentence, or paragraph and output a Spanish translation of the word, phrase, sentence, or paragraph that is input. Such models are trained via supervised models by feeding some specific equivalent words, phrases, sentences, paragraphs, and/or documents (English and Spanish) into the model. The model learns. After receiving more and more data, the model can eventually produce a Spanish translation in many instances without before having received that exact input set of English.

The dataset collected in FIG. 2A may similarly be used in supervised training for training a machine learning model. For each human-to-automated agent and human-to-human agent pair that successfully passed through the filtering in the escalated conversation gathering process 200, the human-to-human agent version of the message may for this embodiment act as the labeled dataset for what the outcome should be for the paired human-to-automated agent message. The machine learning model is trained by using these pairs as example input-output pairs. The machine learning model may internally use a mapping between human-to-automated agent requests and human-to-human agent requests. The machine learning model may be able to learn to recognize and understand acronyms so that the output of the machine learning model includes the representative full group of words instead of the abbreviation. Thus, in the FIG. 3B example, the supplemented portion of the combined message 362 may include the phrase "leave of absence" instead of the acronym "LOA".

FIG. 3C depicts an operation flowchart illustrating an alternative message enhancement process 370 according to at least one embodiment. The alternative message enhancement process 370 is similar to the message enhancement process 300 shown in FIG. 3A but instead of a repository/lookup table for semantic similarity or word matching uses the trained machine learning model that was described in the several previous paragraphs. Thus, for the alternative message enhancement process 370 shown in FIG. 3C, the steps 372, 378, 380, and 382 are essentially equivalent to the steps 302, 312, 316, and 318, respectively, of the message enhancement process 300 shown in FIG. 3A. Specifically, for the step 372 of the alternative message enhancement process 370 a first message is received from a user as part of a human-to-automated agent conversation. Those features and definitions explained above for step 302 apply for the step 372 of the alternative message enhancement process 370.

For the step 374 of the alternative message enhancement process 370, the first message is submitted to a machine learning model to generate a human-to-human agent predicted message. This step may include submitting the first message that is received in step 372 into the machine learning model that was described above, namely to the language-based machine learning model that was trained using the datasets that were gathered in the escalated conversation gathering process 200. The machine learning model may be disposed with the message enhancement program 120 in the second server 122. Thus, the message submission of step 374 may include many similar properties and features as were described for step 304 in the message enhancement process 300, except that the design of the recipient structure will be a machine learning model instead of a lookup table. The first message for step 374 may be the first message 354 from the chatbot conversation 350 shown in FIG. 3B.

For the step 376 of the alternative message enhancement process 370, the output of the machine learning model is added to the first message to form a combined message. The output may be from the machine learning model to which the first message was fed in step 374. The first message may be that message that was received in step 372. The output of the machine learning model may be the predicted human-to-human agent version of the input message. The output may be concatenated to the end of the first message to form the combined message. The combined message 362 shown in FIG. 3B may be an example of the combined message that is produced in step 376. This step 376 may largely be equivalent to the step 310 of the message enhancement process 300 shown in FIG. 3A other than the type of structure that provides the new supplemental words/phrases/sentence(s) to add to the end of the original message.

For instances when the automated agent includes a language-based machine learning model that incorporates BERT or a BERT-type model, the output may be concatenated to the end of the first message to form the combined message with a separator such as "$SEPERATOR$" being used between the original message and the added message. This addition of the separator may be based on requirement of the language model that is incorporated by the automated agent.

For the step 378 of the alternative message enhancement process 370, the combined message is submitted to the automated agent. This combined message may be that message that was produced in step 376. This step 378 may be equivalent to the step 312 of the message enhancement process 300 shown in FIG. 3A.

For the step 380 of the alternative message enhancement process 370, the automated agent produces an intent prediction. This intent prediction is generated based on inputting the combined message generated in step 376 to the automated agent as occurred in step 378. This step 380 may be equivalent to the step 316 of the message enhancement process 300 shown in FIG. 3A.

For the step 382 of the alternative message enhancement process 370, the automated agent-generated response that corresponds to the intent prediction is presented to the user in the conversation. The intent prediction may be that intent prediction that was produced in step 380. This step 382 may be equivalent to the step 318 of the message enhancement process 300 shown in FIG. 3A.

For the message enhancement of FIGS. 3A and 3C, the model may be represented as $f(r\_b)=(r\_h)$ where the request of the human-to-bot message is the input into the function and the output is an equivalent request that is worded for a predicted human-to-human message. The output may be concatenated to the original message to form the combined message $(r\_b+r\_h)$ which is sent to the automated agent, e.g., chatbot, for intent detection. In this way, the automated agent may detect the intent based on $(r\_b+r\_h)$ instead of on $r\_b$ alone.

Some embodiments may include a modification to the message enhancement process 300 and/or to the alternative message enhancement process 370 in that an automated agent prediction confidence is determined. The message enhancement is then invoked first if a confidence level for the intent prediction by the automated agent is lower than a pre-determined threshold. The original message is fed to the automated agent, the automated agent produces an initial intent prediction/classification, and the automated agent also produces a confidence level for the generated intent prediction/classification. In response to the confidence level being lower than the pre-determined threshold, the remaining steps of the message enhancement process 300 and/or to the alternative message enhancement process 370 may be performed to enhance the message. These additional steps eventually include feeding the enhanced message to the automated agent which may improve the confidence level that the automated agent has in its prediction. For the embodiment shown in FIG. 1, the message may be transmitted to the dialogue program 110b at the first server 112 for input into the automated agent before being transmitted as necessary to the second server 122 for message enhancement via the message enhancement program 120. After creating the combined/enhanced message, the combined/enhanced message may then be sent via the communication network 116 back to the first server 112 for inputting into the automated agent. In some embodiments the message enhancement program 120 may also be disposed within the first server 112 so that these two (back-and-forth) external message transmissions via the communication network 116 may be eliminated.

FIGS. 3A, 3B, and 3C illustrate how with the present embodiments, after the initial dataset is collected via the escalated conversation gathering process 200 a human agent is no longer needed to perform the method. The message enhancement process 300 itself and the alternative message enhancement process 370 may each be performed without a human participating or without a human being in the loop at all. This automation without requiring humans is helpful as human labeling can require a massive resources for model creation and, therefore, may be costly. Even the dataset in the escalated conversation gathering process 200 may be performed without additional human labeling, although a human agent participates in the prior conversation such as the escalated conversation 250.

It may be appreciated that FIGS. 2A, 2B, 3A, 3B, and 3C provide illustrations of some embodiments and do not imply any limitations with regard to how different embodiments may be implemented. Many modifications to the depicted embodiment(s), e.g., to a depicted sequence of steps, may be made based on design and implementation requirements.

FIG. 4 is a block diagram 400 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 402a, 402b, 404a, 404b is representative of any electronic device capable of executing machine-readable program instructions. Data processing system 402a, 402b, 404a, 404b may be representative of a smart phone, a computer system, PDA, or other electronic devices. Examples of computing systems, environments, and/or configurations that may represented by data processing system 402a, 402b, 404a, 404b include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

The first and second user computers 102a1, 102a2, the first and second servers 112, 122, and the first human agent computer 132 may include respective sets of internal components 402a, 402b and external components 404a, 404b illustrated in FIG. 4. Each of the sets of internal components 402a, 402b includes one or more processors 406, one or more computer-readable RAMs 408 and one or more computer-readable ROMs 410 on one or more buses 412, and one or more operating systems 414 and one or more computer-readable tangible storage devices 416. The one or more operating systems 414, the message enhancement program 120 in the second server 122 (or in another embodiment in the first server 112), the dialogue program 110a1, 110a2 in the first and second user computers 102a1, 102a2, the dialogue program 110b in the first server 112, and the dialogue program 110c in the human agent computer 132 may be stored on one or more computer-readable tangible storage devices 416 for execution by one or more processors 406 via one or more RAMs 408 (which typically include cache memory). In the embodiment illustrated in FIG. 4, each of the computer-readable tangible storage devices 416 is a magnetic disk storage device of an internal hard drive. Alternatively, each of the computer-readable tangible storage devices 416 is a semiconductor storage device such as ROM 410, EPROM, flash memory, or any other computer-readable tangible storage device that can store a computer program and digital information.

Each set of internal components 402a, 402b also includes a RAY drive or interface 418 to read from and write to one or more portable computer-readable tangible storage devices 420 such as a CD-ROM, DVD, memory stick, magnetic tape, magnetic disk, optical disk or semiconductor storage device. A software program, such as the message enhancement program 120, can be stored on one or more of the respective portable computer-readable tangible storage devices 420, read via the respective R/W drive or interface 418 and loaded into the respective hard drive, e.g., the tangible storage device 416.

Each set of internal components 402a, 402b may also include network adapters (or switch port cards) or interfaces 422 such as a TCP/IP adapter cards, wireless wi-fi interface cards, or 3G, 4G, or 5G wireless interface cards or other wired or wireless communication links. The message enhancement program 120 in the second server 122 (or in another embodiment in the first server 112), the dialogue program 110a1, 110a2 in the first and second user computers 102a1, 102a2, the dialogue program 110b in the first server 112, and the dialogue program 110c in the human agent computer 132 can be downloaded from an external computer (e.g., server) via a network (for example, the Internet, a local area network or other, wide area network or the communication network 116 shown in FIG. 1) and respective network adapters or interfaces 422. From the network adapters (or switch port adaptors) or interfaces 422, the message enhancement program 120 in the second server 122 (or in another embodiment in the first server 112), the dialogue program 110a1, 110a2 in the first and second user computers 102a1, 102a2, the dialogue program 110b in the first server 112, and the dialogue program 110c in the human agent computer 132 are loaded into the respective hard drive, e.g., the tangible storage device 416. The network may include copper wires, optical fibers, wireless transmission, routers, firewalls, switches, gateway computers and/or edge servers.

Each of the sets of external components 404a, 404b can include a computer display monitor 424, a keyboard 426, and a computer mouse 428. External components 404a, 404b can also include touch screens, virtual keyboards, touch pads, pointing devices, and other human interface devices. Each of the sets of internal components 402a, 402b also includes device drivers 430 to interface to computer display monitor 424, keyboard 426 and computer mouse 428. The device drivers 430, R/W drive or interface 418 and network adapter or interface 422 include hardware and software (stored in storage device 416 and/or ROM 410).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
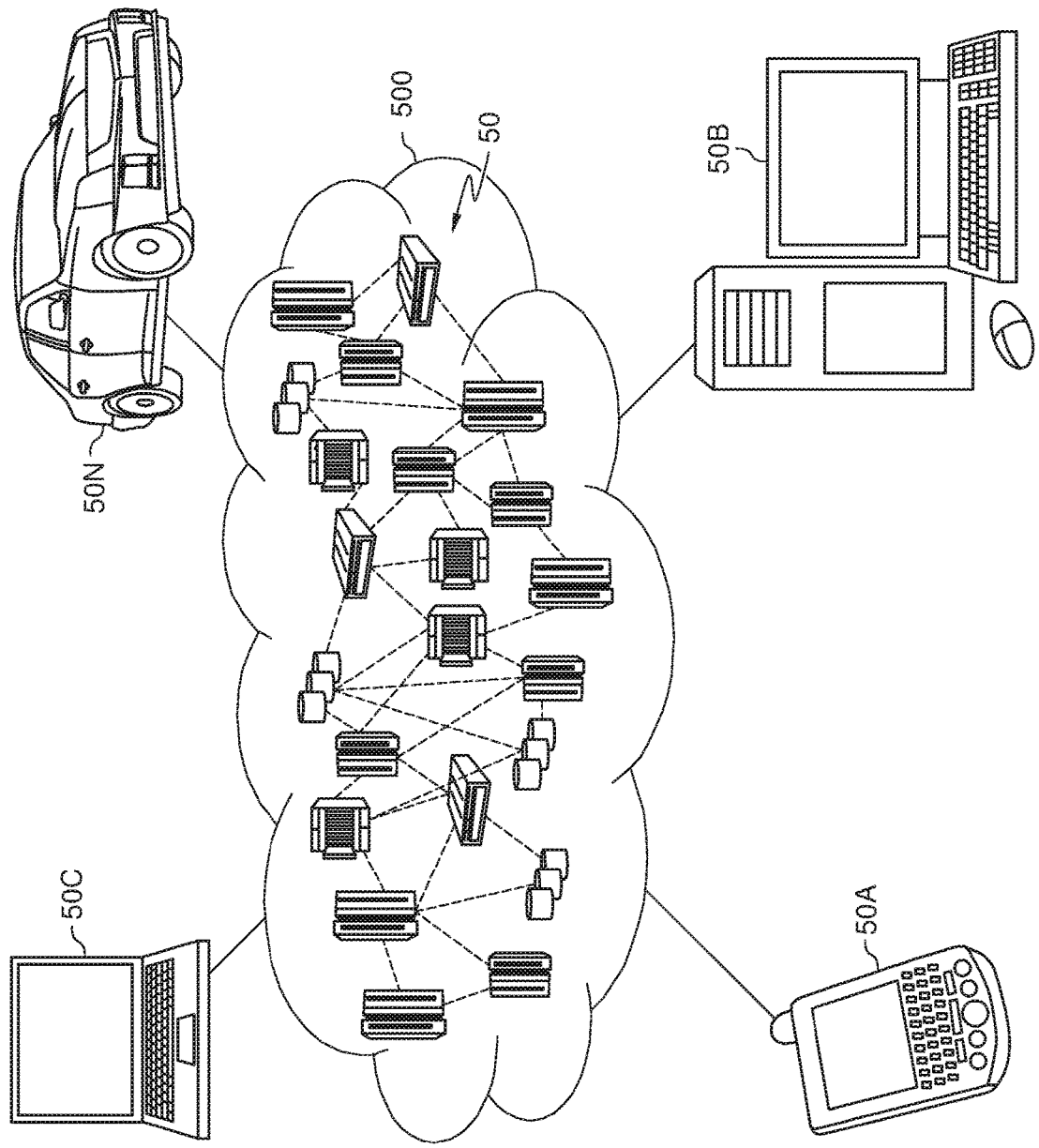
FIG. 5 is a block diagram of an illustrative cloud computing environment including the networked computer environment depicted in FIG. 1, in accordance with an embodiment of the present disclosure.

Referring now to FIG. 5, illustrative cloud computing environment 500 is depicted. As shown, cloud computing environment 500 comprises one or more cloud computing nodes 50 with which local computing devices used by cloud consumers, such as, for example, personal digital assistant (PDA) or cellular telephone 50A, desktop computer 50B, laptop computer 50C, and/or automobile computer system 50N may communicate. Nodes 50 may communicate with one another and may include the individual computers and servers shown in FIG. 1. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 50A-N shown in FIG. 5 are intended to be illustrative only and that computing nodes 50 and cloud computing environment 500 can communicate with any type of computerized device over any type of network and/or network addressable connection (e.g., using a web browser).

Figure 6:
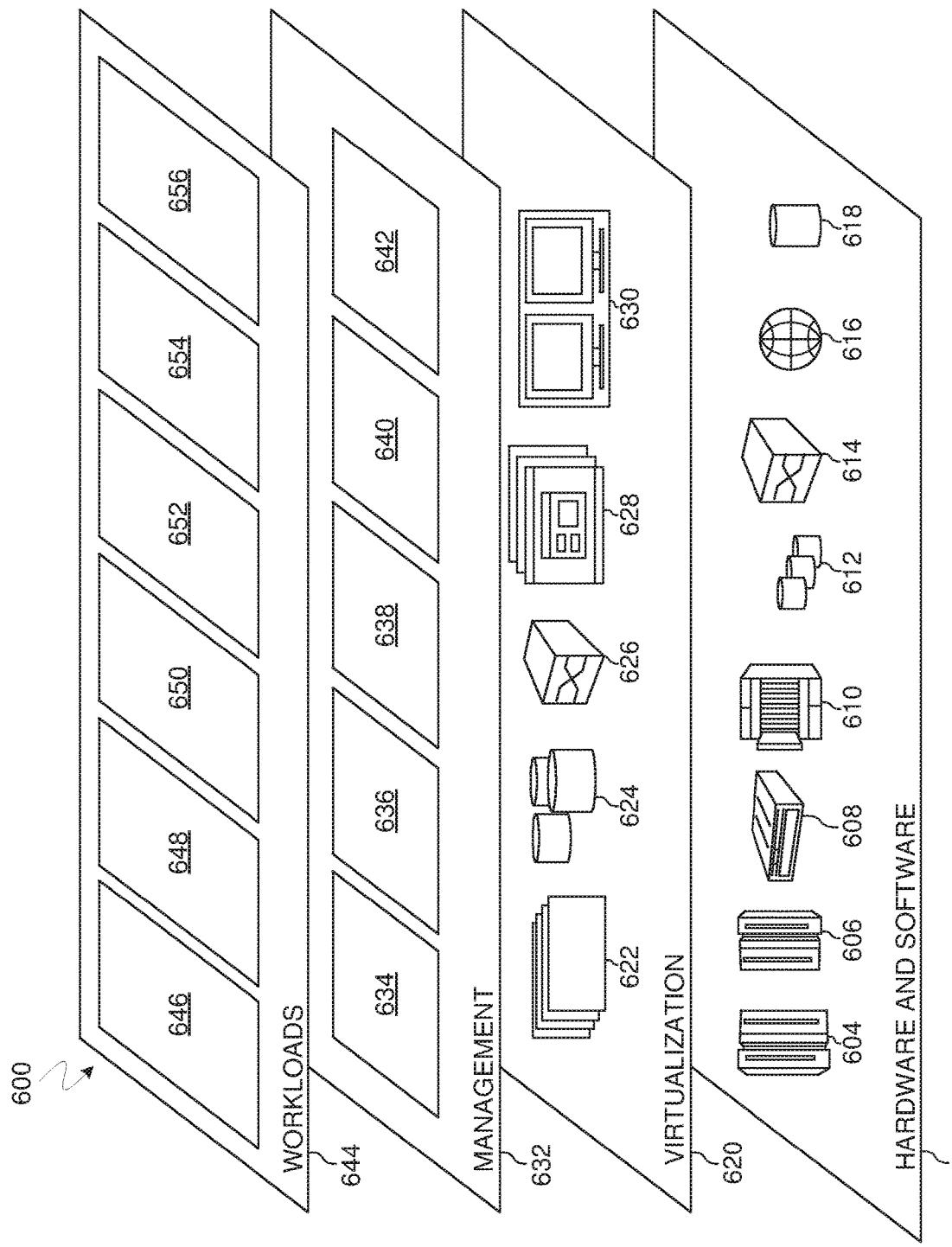
FIG. 6 is a block diagram of functional layers of the illustrative cloud computing environment of FIG. 5, in accordance with an embodiment of the present disclosure.

Referring now to FIG. 6, a set of functional abstraction layers 600 provided by cloud computing environment 500 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 602 includes hardware and software components. Examples of hardware components include: mainframes 604; RISC (Reduced Instruction Set Computer) architecture based servers 606; servers 608; blade servers 610; storage devices 612; and networks and networking components 614. In some embodiments, software components include network application server software 616 and database software 618.

Virtualization layer 620 provides an abstraction layer from which the following examples of virtual entities may be provided: virtual servers 622; virtual storage 624; virtual networks 626, including virtual private networks; virtual applications and operating systems 628; and virtual clients 630.

In one example, management layer 632 may provide the functions described below. Resource provisioning 634 provides dynamic procurement of computing resources and other resources that are utilized to perform tasks within the cloud computing environment. Metering and Pricing 636 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 638 provides access to the cloud computing environment for consumers and system administrators. Service level management 640 provides cloud computing resource allocation and management such that required service levels are met. Service Level Agreement (SLA) planning and fulfillment 642 provide pre-arrangement for, and procurement of, cloud computing resources for which a future requirement is anticipated in accordance with an SLA.

Workloads layer 644 provides examples of functionality for which the cloud computing environment may be utilized. Examples of workloads and functions which may be provided from this layer include: mapping and navigation 646; software development and lifecycle management 648; virtual classroom education delivery 650; data analytics processing 652; transaction processing 654; and escalated conversation gathering and message enhancement 656. A message enhancement program 120 provides a way to use gathered escalated conversations to automatically enhance messages that are being transmitted to an automated agent to help the automated agent better understand appropriately respond to the inquiry couched in the message.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," "including," "has," "have," "having," "with," and the like, when used in this specification, specify the presence of stated features, integers, steps, operations, elements, and/or components, but does not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
receiving a first message from a first user, the first message being generated during a first conversation between the first user and a first automated agent;
producing, via a computer, a second message comprising a same request as the first message but a different language modality than the first message;
combining the second message and the first message to form a combined message, wherein the combining occurs via concatenating the second message to the first message; and
inputting the combined message into the first automated agent such that the first automated agent produces an intent classification for the first message, wherein the first automated agent comprises a natural language processor that performs natural language processing of the combined message.

2. The method of claim 1, wherein the second message was generated in a prior conversation between another user and a human agent.

3. The method of claim 2, wherein the prior conversation comprises an escalated conversation beginning with the other user and an automated agent and escalating to the human agent.

4. The method of claim 3, further comprising:
extracting a first request from a beginning portion of the escalated conversation, wherein the beginning portion occurs between the other user and the automated agent;
extracting a second request from an escalated portion of the escalated conversation, wherein the escalated portion occurs between the other user and the human agent;
comparing the first request to the second request to determine a similarity between the first request and the second request; and
storing the prior conversation in an escalated conversation repository in response to the similarity being greater than a predetermined threshold, wherein the prior conversation includes the second message.

5. The method of claim 4, wherein the second message is stored in the escalated conversation repository so as to be linked to the beginning portion of the escalated conversation.

6. The method of claim 5, wherein:
the producing the second message comprises performing a text comparison of the first message against messages saved in the escalated conversation repository;
the text comparison identifies a text match of the first message and the beginning portion of the escalated conversation; and
the escalated portion is retrieved from the escalated conversation repository and is produced as the second message due to being linked to the beginning portion.

7. The method of claim 1, wherein the producing the second message comprises inputting the first message into a machine learning model and, in response to the inputting, receiving the second message as output from the machine learning model.

8. The method of claim 1, wherein the producing of the second message comprises performing a text comparison of the first message against messages saved in an escalated conversation repository.

9. The method of claim 1, wherein the producing of the second message comprises performing a semantic similarity comparison of the first message against messages saved in an escalated conversation repository.

10. The method of claim 1, further comprising filtering fluff from the first message to find a first utterance, wherein the request is based on the first utterance.

11. The method of claim 1, wherein the first automated agent is a chatbot.

12. The method of claim 1, further comprising:
identifying a topic of the first message; and
comparing the identified topic to a list of topics that are challenging for detecting user intent;
wherein the producing the second message is performed in response to the identified topic being in the list of topics that are challenging for detecting user intent.

13. A computer system comprising:
one or more processors, one or more computer-readable tangible storage media, and program instructions stored on at least one of the one or more computer-readable tangible storage media for execution by at least one of the one or more processors to cause the computer system to:
receive a first message from a first user, the first message being generated during a first conversation between the first user and a first automated agent that comprises a chatbot;
produce a second message having a same request as the first message but a different language modality than the first message;
combine the second message and the first message to form a combined message; and
input the combined message into the first automated agent such that the first automated agent produces an intent classification for the first message.

14. The computer system of claim 13, wherein the second message was generated in a prior conversation between another user and a human agent.

15. The computer system of claim 14, wherein the prior conversation comprises an escalated conversation beginning with the other user and an automated agent and escalating to the human agent.

16. The computer system of claim 13, wherein the producing the second message comprises performing a semantic similarity comparison of the first message against messages saved in an escalated conversation repository.

17. The computer system of claim 13, wherein the combining occurs via concatenating the second message to the first message, and wherein the first automated agent comprises a natural language processor that performs natural language processing of the combined message.

18. A computer program product comprising a computer-readable storage medium having program instructions embodied therewith, wherein the program instructions are executable by a computer system to cause the computer system to:
receive a first message from a first user, the first message being generated during a first conversation between the first user and a first automated agent;
producing a second message having a same request as the first message but a different language modality than the first message;
combine the second message and the first message to form a combined message; and
input the combined message into the first automated agent such that the first automated agent produces an intent classification for the first message, wherein the producing the second message comprises inputting the first message into a machine learning model and, in response to the inputting, receiving the second message as output from the machine learning model.

19. The computer program product of claim 18, wherein the producing the second message comprises performing a semantic similarity comparison of the first message against messages saved in an escalated conversation repository.

20. The computer system of claim 13, wherein the program instructions when executed further cause the computer system to filter out fluff from the first message before producing the second message.

* * * * *